(12) United States Patent
Morishita et al.

(10) Patent No.: US 7,984,260 B2
(45) Date of Patent: Jul. 19, 2011

(54) STORAGE SYSTEM PROVIDED WITH A PLURALITY OF CONTROLLER MODULES

(75) Inventors: Noboru Morishita, Yokohama (JP); Akira Deguchi, Yokohama (JP); Ai Satoyama, Sagamihara (JP); Hisaharu Takeuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 619 days.

(21) Appl. No.: 12/060,977

(22) Filed: Apr. 2, 2008

(65) Prior Publication Data
US 2009/0198942 A1 Aug. 6, 2009

(30) Foreign Application Priority Data
Jan. 31, 2008 (JP) ................................. 2008-020595

(51) Int. Cl.
*G06F 12/06* (2006.01)
(52) U.S. Cl. .......... 711/165; 711/114; 711/170; 714/6.2
(58) Field of Classification Search .................. None
See application file for complete search history.

(56) References Cited

U.S. PATENT DOCUMENTS

| | | | |
|---|---|---|---|
| 6,598,174 B1 * | 7/2003 | Parks et al. | 714/6.22 |
| 7,409,515 B2 * | 8/2008 | Hanai et al. | 711/165 |
| 7,640,408 B1 * | 12/2009 | Halligan et al. | 711/162 |
| 7,818,515 B1 * | 10/2010 | Umbehocker et al. | 711/154 |
| 2006/0095482 A1 * | 5/2006 | Suzuki et al. | 707/204 |
| 2006/0242363 A1 | 10/2006 | Tamura et al. | |
| 2007/0101097 A1 | 5/2007 | Serizawa et al. | |
| 2007/0220514 A1 | 9/2007 | Sugimoto et al. | |
| 2008/0034005 A1 | 2/2008 | Satoyama et al. | |
| 2008/0059697 A1 | 3/2008 | Sakaki et al. | |

FOREIGN PATENT DOCUMENTS
JP 2005-107645 4/2005

OTHER PUBLICATIONS
U.S. Appl. No. 12/007,462, filed Jan. 10, 2008 to K. Ninose.

* cited by examiner

*Primary Examiner* — Kaushikkumar Patel
(74) *Attorney, Agent, or Firm* — Brundidge & Stanger, P.C.

(57) ABSTRACT

A plurality of global LDEV managed by a plurality of controller modules are provided above local LDEV under the control of each controller module. Each global LDEV is correlated to any of the plurality of local LDEV. The controller modules judge whether or not a local LDEV correlated to a global LDEV specified by an I/O request received from a host device or a first other controller module is a management target itself, and if the result of that judgment is affirmative, the controller modules access the local LDEV correlated to the specified global LDEV, while if the result of the judgment is negative, the controller modules transfer the received I/O request to a second other controller module.

8 Claims, 26 Drawing Sheets

FIG. 4A

201 PATH MANAGEMENT INFORMATION

| PATH ENTRY #0 | ~2011 |
| ⋮ |
| PATH ENTRY #(H-1) |

FIG. 4B

2011 PATH ENTRY

| PORT NUMBER |
|---|
| LUN |
| GLOBAL LDEV NUMBER |
| STATUS (NORMAL/BLOCKED) |

FIG. 6A

2053 GLOBAL LDEV ENTRY

| GLOBAL LDEV NUMBER |
|---|
| MODULE NUMBER |
| LOCAL LDEV NUMBER (WHEN CURRENT MODULE) |
| TARGET PROCESSOR INFORMATION (WHEN OTHER MODULE) |
| FORWARD POINTER |
| BACKWARD POINTER |

FIG. 6B

2054 FREE GLOBAL LDEV ENTRY MANAGEMENT INFORMATION

| FREE ENTRY TOP POINTER |
|---|
| FREE ENTRY END POINTER |
| NUMBER OF FREE ENTRIES |

FIG. 8A

207 LOCAL LDEV MANAGEMENT INFORMATION

| LOCAL LDEV ENTRY #0 | ~2071 |
|---|---|
| ⋮ | |
| LOCAL LDEV ENTRY #(L-1) | |

FIG. 8B

2071 LOCAL LDEV ENTRY

| LOCAL LDEV NUMBER |
|---|
| GLOBAL LDEV NUMBER |
| PDEV PATH NUMBER |
| RAID GROUP NUMBER |
| TOP ADDRESS |
| END ADDRESS |
| CAPACITY |
| VOLUME ATTRIBUTE |
| STATUS (NORMAL/BLOCKED) |

FIG. 9A

209 PDEV MANAGEMENT INFORMATION

| PDEV ENTRY #0 | ~2091 |
| --- | --- |
| ⋮ | |
| PDEV ENTRY #(P-1) | |

FIG. 9B

2091 PDEV ENTRY

| PDEV NUMBER |
| --- |
| PDEV PATH NUMBER |
| RAID GROUP NUMBER |
| PDEV STATUS |
| CAPACITY |

FIG. 10A

213 MODULE INSTALLATION MANAGEMENT INFORMATION

| MODULE ENTRY #0 | ~2131 |
| --- | --- |
| ⋮ | |
| MODULE ENTRY #(J-1) | |

FIG. 10B

2131 MODULE ENTRY

| INSTALLATION (INSTALLED/UNINSTALLED) |
| --- |
| STATUS (NORMAL/BLOCKED) |
| TARGET PROCESSOR INFORMATION |

FIG. 10C

215 CONFIGURATION UNIT MANAGEMENT INFORMATION

| CONFIGURATION UNIT ENTRY #0 | ~2151 |
| --- | --- |
| ⋮ | |
| CONFIGURATION UNIT ENTRY #(C-1) | |

FIG. 10D

2151 CONFIGURATION UNIT ENTRY

| INSTALLATION (INSTALLED/UNINSTALLED) |
| --- |
| STATUS (NORMAL/BLOCKED) |
| NUMBER OF FAILURES |

FIG. 11A

<u>217</u> DATA MIGRATION MANAGEMENT INFORMATION

| DATA MIGRATION ENTRY #0 |
|---|
| ⋮ |
| DATA MIGRATION ENTRY #(D-1) |

<u>2171</u> DATA MIGRATION ENTRY

| SOURCE GLOBAL LDEV NUMBER |
|---|
| TARGET GLOCAL LDEV NUMBER |
| MIGRATION STATUS |
| MIGRATION DATA TRANFER PROGRESS POINTER |

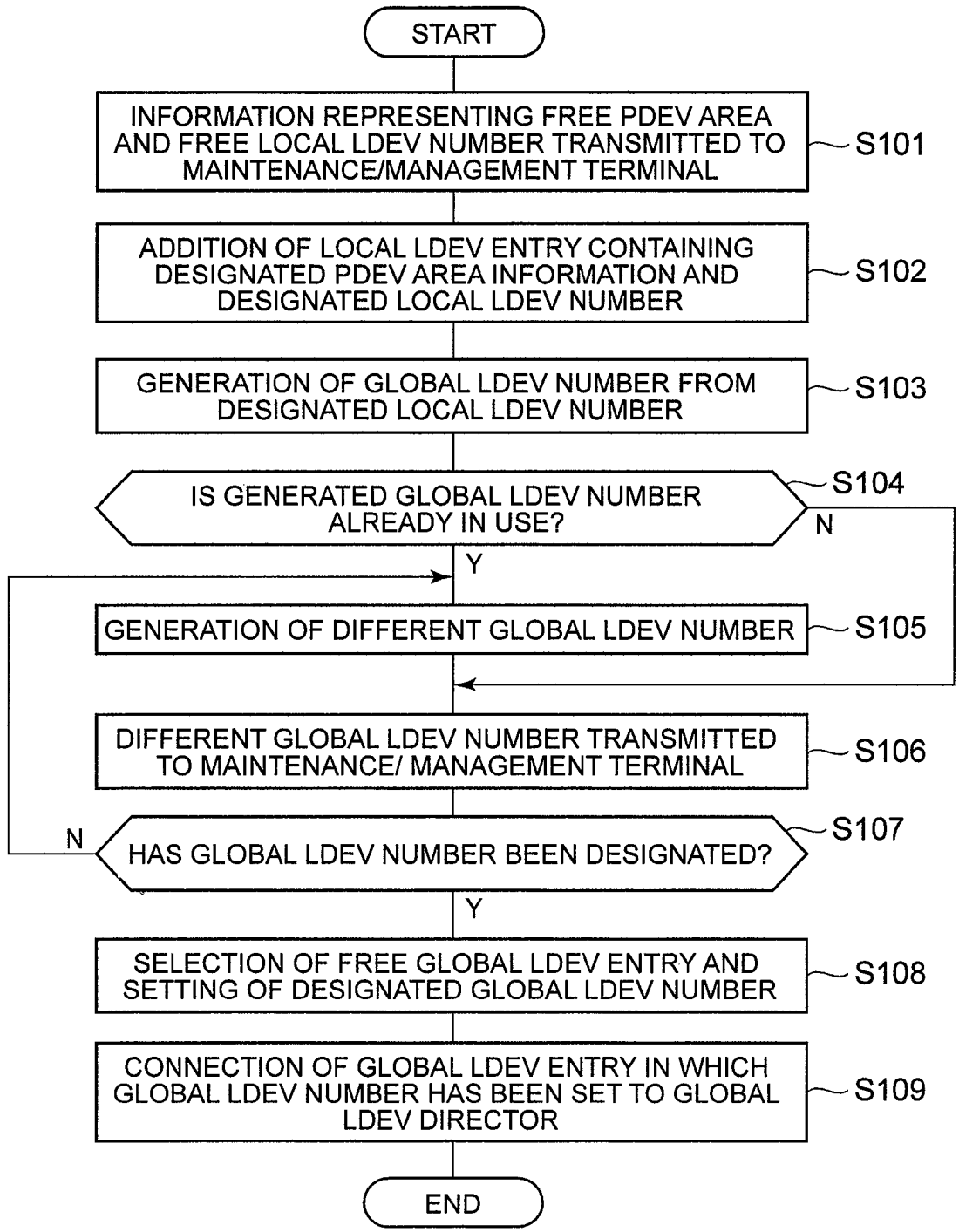

STORAGE SYSTEM PROVIDED WITH A PLURALITY OF CONTROLLER MODULES

CROSS-REFERENCE TO PRIOR APPLICATION

This application relates to and claims the benefit of priority from Japanese Patent Application number 2008-20595, filed on Feb. 14, 2008, the entire disclosure of which is incorporated herein by reference.

BACKGROUND

The present invention generally relates to management of logical storage devices possessed by a storage system.

A known example of a technology relating to management of logical storage devices (LDEV) possessed by a storage system is disclosed in, for example, Japanese Patent Application Laid-open No. 2005-107645. This publication discloses a technology in which a logical unit of a second storage system present outside a first storage system is managed within the first storage system.

In addition to the need for, for example, storage systems employing a large-scale configuration having high performance and/or large capacity, there is also a need for inexpensive storage systems employing a small-scale configuration. According to a discussion by the present applicant, the use of a scale-out storage system provided with a plurality of controller modules enables a storage system to have a large-scale configuration or small-scale configuration by adjusting the number of controller modules. In this case, each controller module manages the LDEV under its control (namely, the LDEV it is able to access), but not manage LDEV under the control of other controller modules. Furthermore, a storage system may be provided with a plurality of physical storage modules having a plurality of physical storage devices, and a storage system module may be composed in the form of a set consisting of a single controller module and a single physical storage module (or in other words, the storage system may be composed of a plurality of storage system modules).

In this configuration, the following method has been proposed as a method for enabling, for example, an I/O request for accessing an LDEV under the control of a second controller module to be received by a first controller module. Namely, the first controller module manages a virtual LDEV correlated with a real LDEV managed by the second controller module. In this case, the first controller module receives an I/O request designating the virtual LDEV, and the received I/O request is transferred to the second controller module managing the real LDEV correlated to the virtual LDEV.

According to this method, the first controller module manages the virtual LDEV. Consequently, in the case of a limitation on the number of LDEV able to be managed by one controller module, the number of real LDEV able to be managed by the controller module decreases by the number of virtual LDEV being managed. In addition, since, in the first controller module, the virtual LDEV uses cache memory of the first controller module, and, in the second controller module, the real LDEV correlated to the virtual LDEV uses cache memory of the second controller module, when considering in terms of the entire storage system, data stored in the real LDEV ends up consuming the cache memory of the storage system.

SUMMARY

Thus, an object of the present invention is to prevent an increase in the number of LDEV as management subjects under the control of each controller module even if each controller module is allowed to receive I/O requests for accessing an LDEV under the control of another controller module. In addition, cache memory of a storage system is inhibited from being consumed by data of a specific LDEV.

Other objects of the present invention will be understood from the following explanation.

A plurality of global LDEV managed by a plurality of controller modules are provided above local LDEV under the control of each controller module. Each global LDEV is correlated to any of the plurality of local LDEV. A storage resource of each controller module stores global device management information containing information indicating whether or not local LDEV correlated to each global LDEV is a management target of that module, and local device management information in the form of information relating to local LDEV targeted for management by that module among the plurality of local LDEV. A controller module judges whether or not a local LDEV correlated to a global LDEV specified by an I/O request received from a host device or other first controller module is managed by that controller module based on the global device management information, and accesses the local LDEV correlated to the specified global LDEV based on the local device management information if the judgment result is affirmative, or transfers the received I/O request to another second controller module if the judgment result is negative.

BRIEF DESCRIPTION OF THE DRAWINGS

FIG. 4A shows a configuration of path management information;

FIG. 4B shows a configuration of a path entry;

FIG. 6A shows a configuration of a global LDEV entry;

FIG. 6B shows a configuration of free global LDEV entry management information;

FIG. 8A shows a configuration of local LDEV management information;

FIG. 8B shows a configuration of a local LDEV entry;

FIG. 9A shows a configuration of PDEV management information;

FIG. 9B shows a configuration of PDEV entry;

FIG. 10A shows a configuration of module installation management information;

FIG. 10B shows a configuration of a module entry;

FIG. 10C shows a configuration of configuration unit management information;

FIG. 10D shows a configuration of a configuration unit entry;

FIG. 11A shows a configuration of data migration management information;

FIG. 11B shows a configuration of a data migration entry;

FIG. 12 is a flow chart of the operation of a device definition system;

DESCRIPTION OF THE PREFERRED EMBODIMENTS

Figure 1:
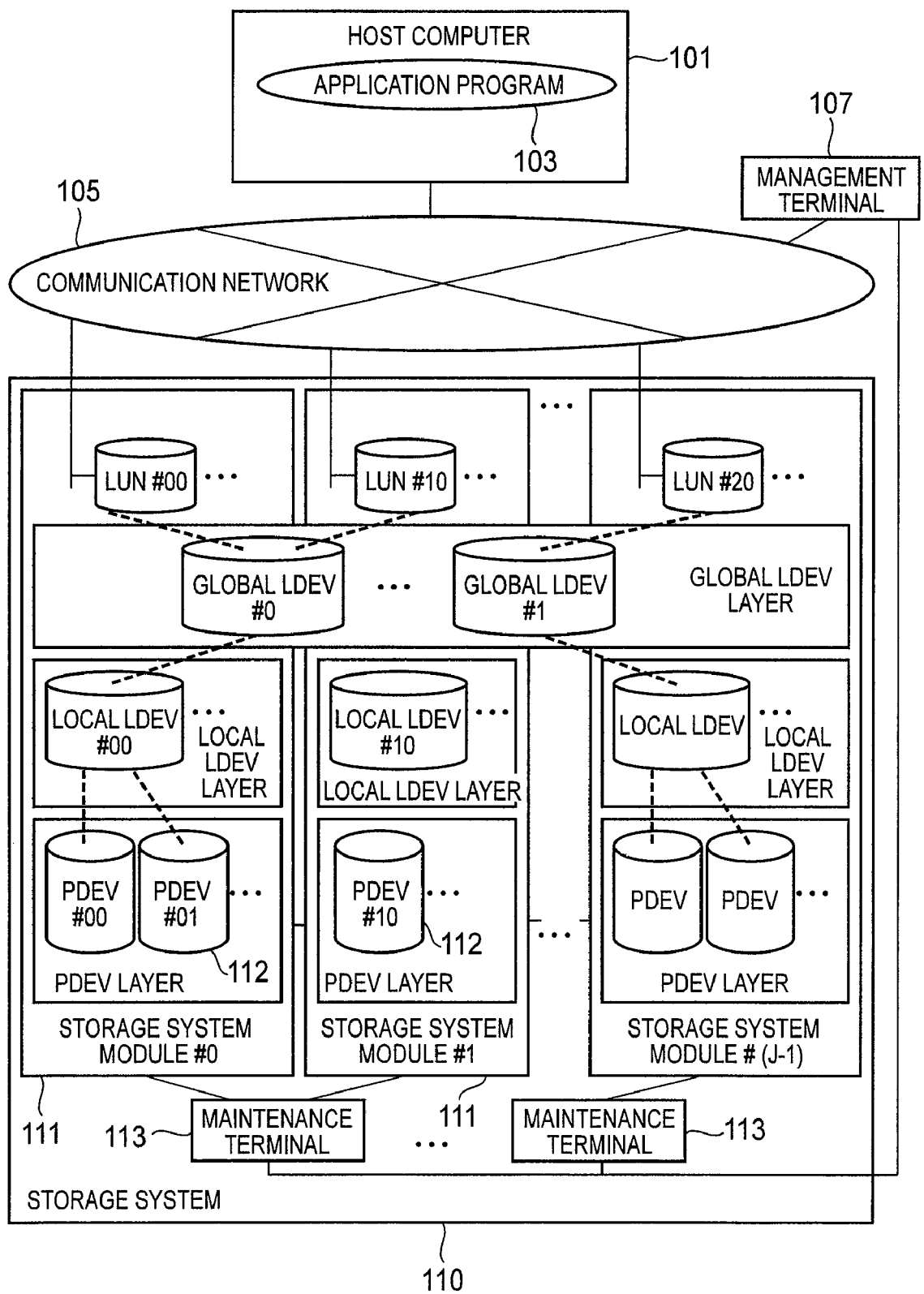
FIG. 1 shows a configuration of a storage system as claimed in a first embodiment of the present invention.

In a first embodiment, a storage system is provided with a plurality of controller modules for receiving I/O requests, a plurality of physical storage devices for storing data in accordance with an I/O request, a plurality of global logical storage devices, and a plurality of local logical storage devices based on the plurality of physical storage devices. Each global logical storage device is managed by the plurality of controller modules, and is in the form of a logical storage device (such as a virtual LDEV) correlated to any of the plurality of local logical storage devices. Each local logical storage device is a logical storage device (such as a real LDEV) managed by any of the plurality of controller modules. Each controller module is provided with an intermodule connection unit, a storage resource and an access control unit. The intermodule connection unit is in the form of, for example, a switch, and is connected with one or more other controller modules among the plurality of controller modules. The intermodule connection unit may also serve as a connection unit (such as a switch) for connecting configuration units within a single controller module. The storage resource stores global device management information containing information indicating whether or not local logical storage devices correlated to each global logical storage device are management subjects of the controller modules, and local device management information in the form of information relating to local logical storage devices targeted for management by the controller modules among the plurality of local logical storage devices. The access control unit judges whether or not a local logical storage device correlated to a global logical storage device specified by an I/O request received from the host device or another first controller module among the one or more other controller modules is a management subject of the controller modules based on the global device management information, and accesses the local logical storage device correlated to the specified global logical storage device based on the local device management information if the judgment result is affirmative, or transfers the received I/O request to another second controller module among the one or more other controller modules if the judgment result is negative. The host device may be, for example, a host computer or another storage system.

In a second embodiment, each of the controller modules in the first embodiment is further provided with a data migration control unit. The data transfer migration units control migration of data from a first local logical storage device among the plurality of local logical storage devices correlated to a first global logical storage device among the plurality of global logical storage devices, to a second local logical storage device among the plurality of local logical storage devices correlated to a second global logical storage device among the plurality of global logical storage devices. A first data migration control unit possessed by a first controller module managing the first local logical storage device updates information relating to the first global logical storage device among the global device management information stored by the storage resource possessed by the first controller module, to information indicating that a local logical storage device correlated to the first global logical storage device is not a management subject of the first controller module. A second data migration control unit possessed by a second controller module managing the second local logical storage device updates information relating to the first global logical storage device among the global device management information stored by the storage resource possessed by the second controller module, to information indicating that the first global logical storage device is correlated to the second local logical storage device managed by the second controller module.

In a third embodiment, cache memory is contained in the storage resources of each of the storage modules in the second embodiment for temporarily storing data to be written to the local logical storage devices or data read from the local logical storage devices. The first data migration control unit reads data from the first local logical storage device during the data migration, writes the read data to a first cache memory in the storage resource possessed by the first controller module, and notifies the second data migration control unit of data location information indicating the location of the written data. The second data migration control unit reads data from the location of data specified by data location information received from the first data migration control unit during the data migration, and writes the read data to the second local logical storage device.

In a fourth embodiment, cache memory is contained in the storage resources of each of the storage modules in any of the first to third embodiments for temporarily storing data to be written to the local logical storage devices to or data read from the local logical storage devices. The received I/O request is a read request. The access control unit possessed by the other controller modules reads data from a local logical storage device correlated to a global logical storage device specified by a read request received from the controller modules, writes the read data to the cache memory possessed by the other controller modules, and notifies the access control unit possessed by the controller modules of data location information indicating the location of the written data. The access control unit possessed by the controller modules reads data from the location of data specified by data location information received from the access control unit possessed by the other controller modules, and transmits the read data to the source of the read request.

In a fifth embodiment, cache memory is contained in the storage resources of each of the storage modules in any of the first to fourth embodiments for temporarily storing data to be written to the local logical storage devices or data read from the local storage devices. The received I/O request is a write request. The access control unit possessed by the controller modules writes data in accordance with the received write request to the cache memory possessed by the controller modules, and notifies the access control unit possessed by the other controller modules of the source of the write request of data location information indicating the location of the written data. The access control unit possessed by the other controller modules reads data from the location of data specified by the data location information received from the access control unit possessed by the controller modules, and writes the read data to a local logical storage device correlated to a global logical storage device specified by the write request.

In a sixth embodiment, a plurality of a first type of global device management information elements corresponding to the plurality of global logical storage devices, and two or more of a second type of global device management information elements, are contained in the global device management information in any of the first to fifth embodiments. Information relating to a corresponding global logical storage device is registered in each of the first type of global device management information elements. The number of the second type of global device management information elements is less than the number of the first type of global device management information elements. One or more first type global device management information elements among the plurality of first type global device management information elements is correlated to the second type of global device management information elements. Each second type of global device management information element is specified by a hash value of an identifier of the global logical storage devices.

In a seventh embodiment, in the case the same global logical storage device correlates to a plurality of paths capable of being designated by the host device in any of the first to sixth embodiments, an access control unit of each of the controller modules provides the host device with an identifier of the same global logical storage device no matter which of the plurality of paths is used to receive an inquiry command.

In an eighth embodiment, an identifier of each of the global logical storage devices in any of the first to seventh embodiments contains an identifier of a controller module that generated the global logical storage device, an identifier of a local logical storage device correlated to the global logical storage device, and a non-duplicated code serving as a different code even if a global logical storage device, to which the same local logical storage device is correlated, is generated by the same controller module. This non-duplicated code may be, for example, a number updated each time a controller module is booted, or the time and date of generation of the identifier of the global logical storage device.

In a ninth embodiment, one or more transfer paths are present between the controller modules and the other controller modules in any of the first to eighth embodiments. Each of the controller modules is further provided with a global device blocking unit. The global device blocking unit blocks a global logical storage device correlated to a local logical storage device possessed by the other controller modules when none of the one or more transfer paths is able to allow the received I/O request to pass therethrough (by, for example, updating the status of a global logical storage device to "blocked"). In the case the controller modules have received an I/O request specified by a blocked global logical storage device, access to that global logical storage device is disabled. On the other hand, in the case the other controller modules have received in I/O request specified by a global logical storage device blocked by the controller modules, access is not necessarily disabled. This is because, since the global logical storage device is correlated to a local logical storage device managed by the other controller modules, there is a possibility that the other controller modules can access the local logical storage device.

In a tenth embodiment, each of the controller modules in the ninth embodiment is further provided with a global device recovery unit. In the case recovery of any of the one or more transfer paths has been detected, the global device recovery unit notifies the other controllers of an identifier of a global logical storage device correlated to a local logical storage device that is a management subject of the controller modules, and inquires of the status of a blocked global logical storage device correlated to a local logical storage device possessed by the other controller modules to the other controller modules, and in the case the result of the inquiry is normal, the blocked global logical storage device correlated to a local logical storage device possessed by the other controller modules is recovered.

At least one of the access control unit, data migration control unit, global device blocking unit and global device recovery unit can be constructed with hardware, a computer program or a combination thereof (for example, realizing a portion thereof with a computer program, and realizing the remainder with hardware). A computer program is executed by loading into a processor. In addition, a storage area present in memory or other hardware resource may also be suitably used during information processing performed by loading a computer program into a processor. In addition, a computer program may be installed in a computer from a recording medium such as CD-ROM, or may be downloaded to a computer via a communication network.

The following provides a detailed explanation of an embodiment of the present invention with reference to the drawings. In the case a computer program is used as a subject in the following explanation, it should be understood that processing is actually carried out by a processor (CPU) that executes that computer program.

FIG. 1 shows the configuration of a storage system as claimed in an embodiment of the present invention.

A storage system 110 is composed of J (where, J is an integer of 2 or more) storage system modules 111, and the system can be expanded or reduced in units of the storage system modules 111. Consequently, if the number of storage system modules 111 is increased, a large capacity, high-performance large-scale configuration can be realized, while if the number of storage system modules 111 is decreased, a low-cost, small-scale configuration can be realized.

One or a plurality of processing terminals (to be referred to as "maintenance terminals") 113 for maintaining one or more of the J storage system modules 111 are provided in the storage system 110. One or a plurality of the maintenance terminals 113 communicates with a management terminal 107. The management terminal 107 or the maintenance terminals 113 transmit various requests to an arbitrary or prescribed storage system module 111 among the J storage system modules 111.

The J storage system modules 111, management terminal 107 and a host computer (to be referred to as a "host") 101 are connected to a communications network 105. An I/O request (input/output request (read/write request)) is transmitted to the storage system 110 as a result of, for example, an application program 103 being executed by a CPU (central processing unit) within the host 101.

Each storage system module 111 is provided with one or a plurality of physical storage devices (to be referred to as "PDEV") 112. A drive having a storage medium such as a hard disk drive (HDD) or flash memory drive can be used for the PDEV 112.

Although each storage system module 111 manages one or a plurality of LDEV (to be referred to as "local LDEV") based on one or a plurality of PDEV 112 provided by itself (current module) and a number specified by the host 101 in the form of a logical unit number (LUN), each storage system module 111 does not manage one or a plurality of local LDEV or LUN managed by other storage system modules (which may also be referred to as "other modules") 111. In other words, although a PDEV layer and a local LDEV layer are logically present in each storage system module 111, the PDEV layer and the local LDEV layer are contained in each storage system module 111, and do not extend across other storage system modules 111.

In the present embodiment, a global LDEV layer is provided above the local LDEV layer but below the LUN. Different from the local LDEV layer, the global LDEV layer extends across J storage system modules 111. In other words, in the present embodiment, global LDEV managed with J (namely, all) storage system modules 111 are provided above the local LDEV managed only by individual storage system modules 111. The local LDEV may be real LDEV based on one or more PDEV 112, or may be virtual LDEV correlated to LDEV within another storage system not shown. In contrast, global LDEV are virtual LDEV that are correlated to any of the plurality of local LDEV in a plurality of storage system modules 111. In addition, an LUN is correlated to the global LDEV.

For example, in the case an I/O request designating LUN #00 has been received by a storage system module #0, the storage system module #0 judges whether a local LDEV #00 correlated by a global LDEV #0 correlated to the LUN #00 is a management subject thereof (whether it is under the control of the current module), or is a management subject of another module 111. Here, since the local LDEV #00 is judged to be a management subject of the current module, the storage system module #0 accesses the local LDEV #00 in accordance with the received I/O request. As a result, access is made to a PDEV #00 and #01 serving as the basis of the local LDEV #00.

In the case an I/O request designating an LUN #20 has been received by the storage system module #0, that I/O request is transferred from the storage system module #0 to a storage system module #2 either directly or indirectly (for example, via at least one other module 111). Namely, since a local LDEV correlated by the global LDEV #1 correlated to the LUN #20 is not a management subject of the storage system module #0, but rather a management subject of the storage system module #2, that local LDEV is judged to be a management subject of another module in the judgment described above.

Furthermore, a plurality of LUN can be correlated to a global LDEV. In other words, a plurality of paths connecting global LDEV can be set. For example, in the example of FIG. 1, in the case storage system modules #0 and #1 have received an inquiry command from the host 101, the storage system module #0 replies to the host 101 with the global LEDV #0 as the device correlated to LUN #00, and the storage system module #1 replies to the host 101 with the global LDEV number of global LDEV #0 as the device correlated to LUN #10. Consequently, the host 101 is able to determine that a different LUN is correlated to the same global LDEV #0. For this reason, the host 101 is able to recognize a plurality of paths connected to global LDEV #0. When the host 101 accesses the global LDEV #0, it arbitrarily, or in accordance with prescribed rules, selects one path among the plurality of paths, and transmits an I/O command designating the LUN corresponding to the selected path. According to the example of FIG. 1, the host 101 can access local LDEV #00 whether it transmits an I/O command designating LUN #00 or transmits an I/O command designating LUN #10.

Figure 2:
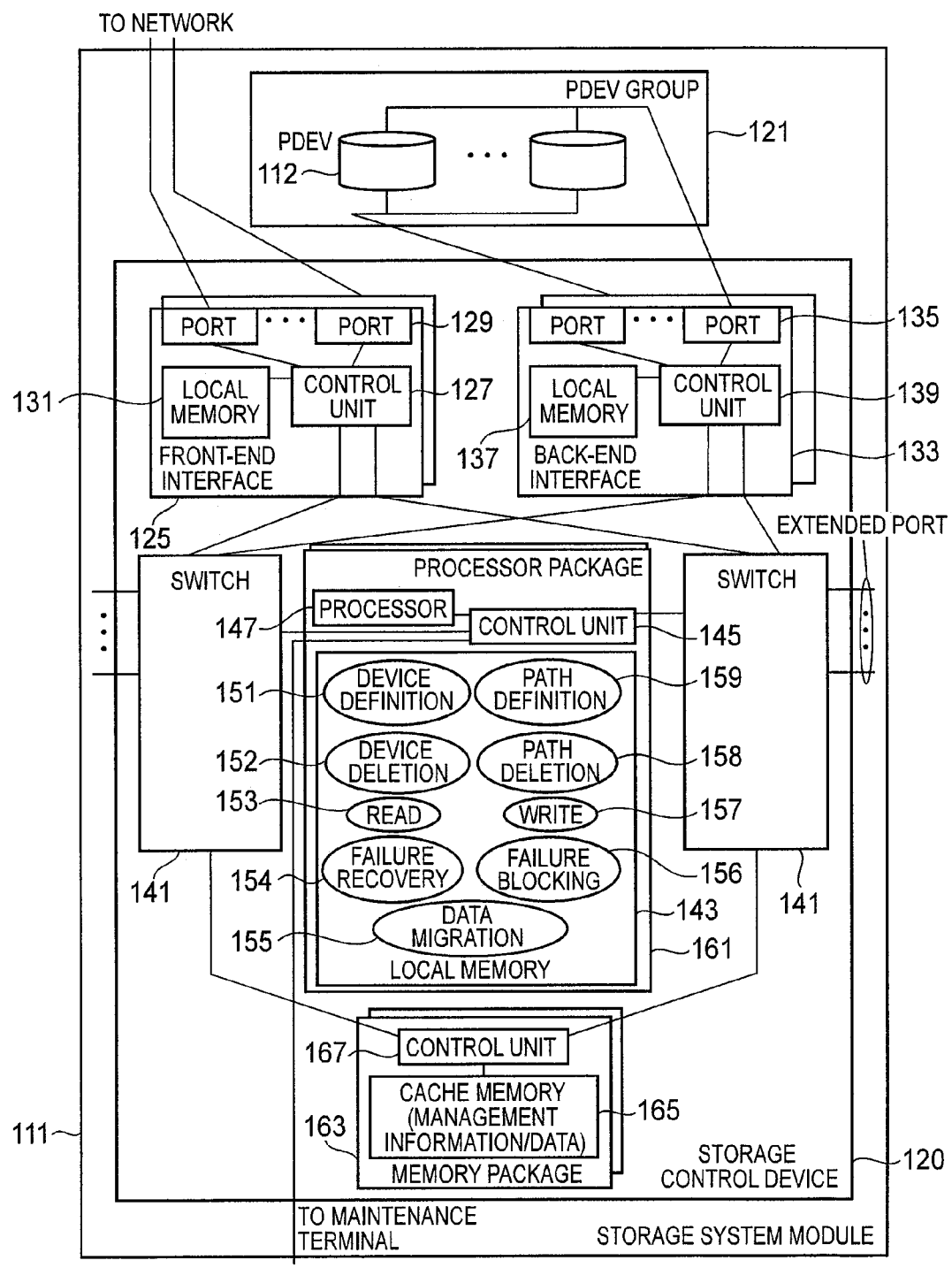
FIG. 2 shows a configuration of a storage system module.

FIG. 2 shows the configuration of a storage system module 111.

The storage system module 111 is provided with a PDEV group 121 composed of a plurality of PDEV 112, and a storage control device (controller module) 120 for controlling access to PDEV 112 in the PDEV group 121. Furthermore, instead of being composed in storage system module units, the storage system 110 can be expanded or reduced in units of PDEV group (which may also be referred to as PDEV modules) 121 or storage control device 120.

The storage control device 120 is provided with a front-end interface 125, a back-end interface 133, a processor package 161, a memory package 163, and a switch 141. These elements 125, 133, 161, 163 and 141, and paths from the back-end interface 133 to each PDEV 112 are each duplicated, and for this reason, even if a failure occurs in one of the elements, the other elements can still be used.

The front-end interface 125 is a circuit board for controlling communication with the host 101. The front-end interface 125 is provided with, for example, a plurality of ports 129 for accepting I/O requests from the host 101, a memory 131 (also referred to as "local memory"), and a control unit 127. The control unit 127 is, for example, a data transfer circuit for controlling communication between the ports 129 and the local memory 131. The control unit 127 contains, for example, a direct memory access (DMA) circuit.

The back-end interface 133 is a circuit board for controlling communication with each PDEV connected to that back-end interface 133. The back-end interface 133 is provided with, for example, a plurality of ports 135 for communicating with PDEV 112, a memory (also referred to as "local memory") 137, and a control unit 139. The control unit 139 is, for example, a data transfer circuit for controlling communication between the ports 135 and the local memory 137.

The processor package 161 is provided with one or a plurality of processors (typically microprocessors) 147, a memory 143 (to be referred to as "local memory") and a control unit 145. The processor 147 carries out, for example, front-end processing (processing for the host 101) and back-end processing (processing for the local LDEV). The control unit 145 is, for example, a data transfer circuit for controlling communication between the processor 147 and the local memory 143. A computer program executed by being loaded into the processor 147 via the control unit 145 in the form of, for example, a device definition program 151, a device deletion program 152, a read program 153, a failure recovery program 154, a data migration program 155, a failure blocking program 156, a write program 157, a path deletion program 158 and a path definition program 159, is stored in the local memory 143. The device definition program 151 is a program for defining global LDEV. The device deletion program 152 is a program for deleting global LDEV. The read program 153 is a program for carrying out processing relating to a received read request. The failure recovery program 154 is a program for carrying out processing relating to global LDEV that has recovered from being blocked due to the occurrence of a failure. The data migration program 155 is a program for carrying out processing relating to data migration between global LDEV. The failure blocking program 156 is a program for blocking global LDEV due to the occurrence of a failure. The write program 157 is a program for carrying out processing relating to a write request. The path deletion program 158 is a program for deleting a path connecting to a global LDEV. The path definition program 159 is a program for defining a path connecting to a global LDEV.

The memory package 163 is a circuit board having a volatile memory in the form of cache memory 165, and a control unit (adapter) 167 serving as an interface during writing and reading of data to the cache memory 165. Writing subject data (to be referred to as "write data") written to a local LDEV, and reading subject data (to be referred to as "read data") read from a local LDEV, are temporarily stored in the cache memory 165. In addition, management information is stored in the cache memory 165. A detailed explanation of management information is provided to follow with reference to FIGS. 3 to 11B. In addition, the cache memory 165 may be provided with a battery backup to avoid data stored in the cache memory 165 that has been updated from the host but not yet written to PDEV group 121 from being lost during a power failure. In addition, the cache memory 165 may also be composed with a nonvolatile storage medium such as flash memory.

The switch 141 is a circuit board for controlling communication between each of the front-end interface 125, back-end interface 133, processor package 161 and memory package 163. The front-end interface 125, back-end interface 133, processor package 161 and memory package 163 are connected to the switch 141. In addition, the switch 141 has an extended port, and is connected to a switch 141 within another storage system module 111 via an extended port and a link (such as a cable) 1. Namely, the switch 141 is connected so that the storage system module 111 is able to exchange data with other storage system modules 111.

Although connections between storage system modules 111 may be realized by connecting their corresponding front-end interfaces 125 or back-end interfaces 133, in the present embodiment, these connections are realized by connecting switches 141 as described above. For example, all of the switches 141 in all of the storage system modules 111 are each connected to all other switches 141. As a result, an I/O request received from the host 101 can be transferred by any storage system module 111 to any other desired storage system module 111 without having to go through one or more other storage system modules 111.

Furthermore, connections between switches 141 are not limited to that described above, but may also be a connection between a single switch 141 and at least one other switch 141. In other words, in the case of transferring an I/O request from a certain storage system module 111 to another storage system module 111, these connections may go through at least one other storage system module 111.

In the following descriptions, a coupling realized by switch 141 among the front-end interface 125, the back-end interface 133, the processor package 161 and the memory package 163, respectively, may be referred to as a "tight coupling", while a coupling a switch 141 within a storage system module 111 and a switch 141 within another storage system module 111 may be referred to as a "loose coupling". This is because management information stored in cache memory 165 of a single storage system module 111 can be accessed or updated directly between packages within that single storage system module 111, while on the other hand, exchange of management information between storage system modules 111 is such that direct access and updating of management information stored in cache memory 165 of another storage system module 111 is not permitted, with access and updating only being allowed indirectly by requesting a processor 147 of another processor package 161. In other words, tight coupling refers to coupling by which management information is accessed or updated directly (namely, coupling realized by switches 141), while loose coupling refers to coupling by which management information is accessed or updated indirectly (namely, coupling realized by links between corresponding switches).

The following provides a detailed explanation of management information stored in cache memory 165. Furthermore, management information is not limited to cache memory 165, but rather may be stored in a different storage resource (such as local memory 131, 137 or 143) within a storage system module 111. In addition, square brackets [ ] are used to represent information elements.

Figure 3:
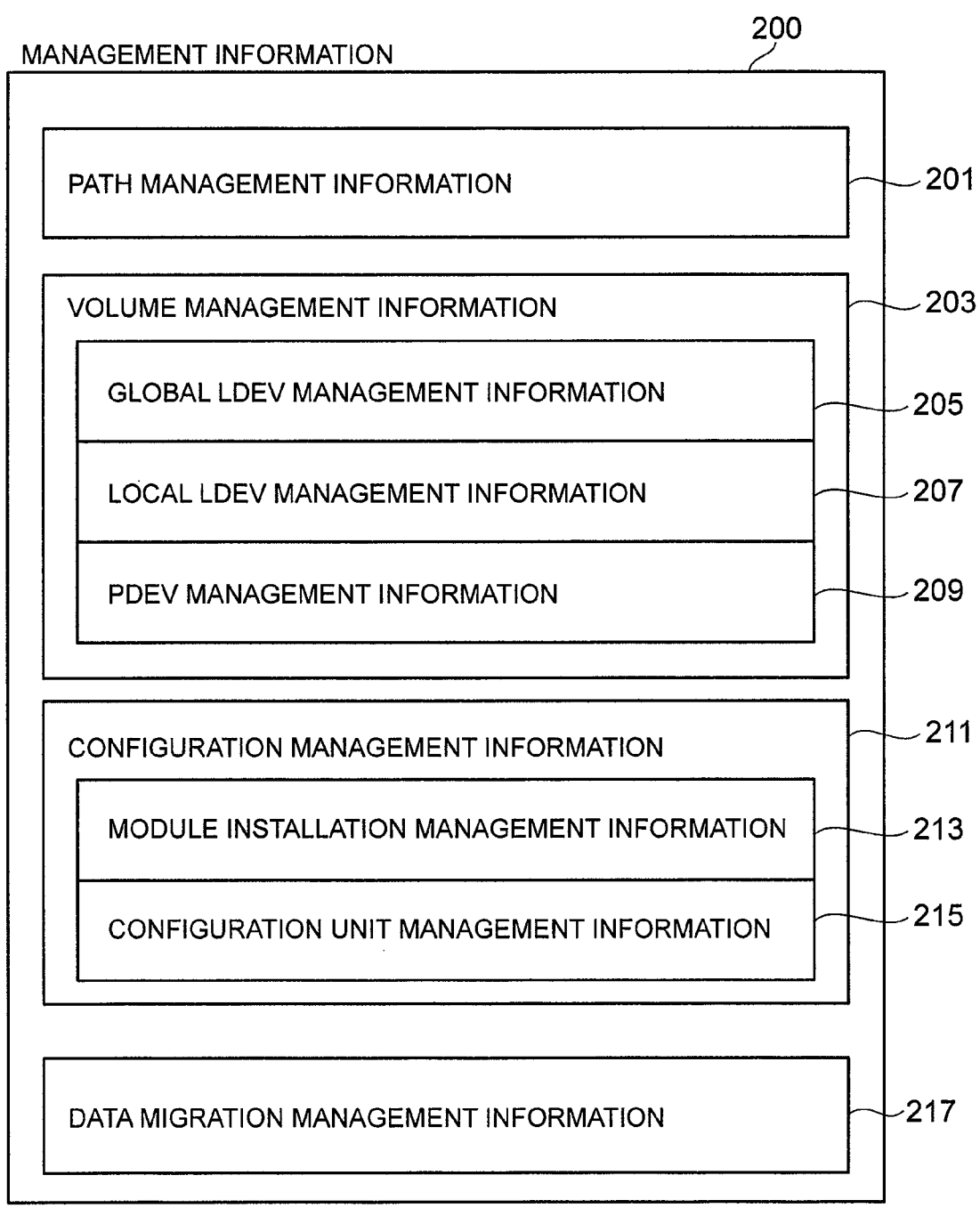
FIG. 3 shows a configuration of management information.

FIG. 3 shows a configuration of management information. In the following explanations of FIGS. 3 to 11B, a storage system module 111 having this management information is referred to as "current module 111", while a storage system module 111 other than the current module 111 is referred to as "another module 111".

Management information 200 consists of information relating to the storage system module 111 retaining this management information 200 and information relating to global LDEV and the like. For example, path management information 201, volume management information 203, configuration management information 211 and data migration management information 217 are contained in management information 200. Global LDEV management information 205, local LDEV management information 207 and PDEV management information 209 are contained in volume management information 203. Module installation management information 213 and configuration unit management information 215 are contained in configuration management information 211.

FIG. 4A shows a configuration of path management information 201.

Path management information 201 consists of information relating to paths connected to global LDEV. The path management information 201 is composed of a plurality of path entries 2011. Each path entry 2011 corresponds to each path possessed by the current module 111.

FIG. 4B shows a configuration of a path entry 2011. In the following explanation of FIG. 4B, a path corresponding to this path entry 2011 is referred to as a "subject path".

A [port number], [LUN], [global LDEV number] and [status] are contained in the path entry 2011. The [port number] is a number of a port 129 (port 129 possessed by the front-end interface 125) through which the subject path passes. [LUN] is the LUN through which the subject path passes. [Global LDEV number] is the number of the global LDEV connected to the subject path. [Status] is the status of the global LDEV connected to the subject path. Examples of [status] include "normal" meaning that the global LDEV connected to the subject path is normal, and "blocked" meaning that the global LDEV cannot be accessed by the current module 111.

Figure 5A:
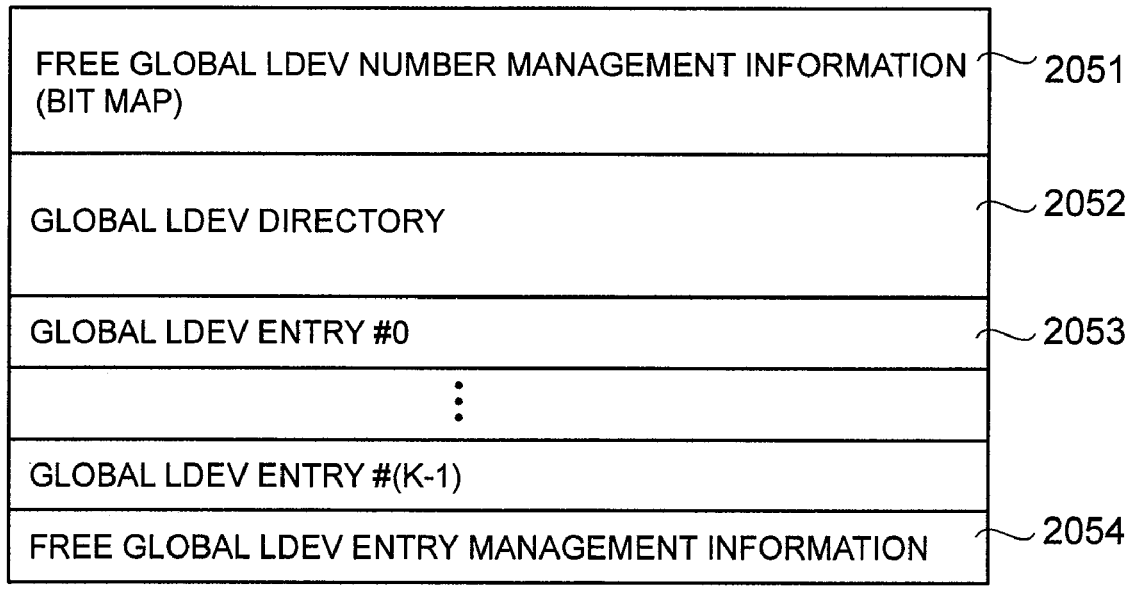
FIG. 5A shows a configuration of global LDEV management information.

FIG. 5A shows a configuration of global LDEV management information 205.

Global LDEV management information 205 consists of information relating to a plurality of global LDEV. Global LDEV management information 205 is composed of free global LDEV number management information 2051, global LDEV directory 2052, a plurality of global LDEV entries 2053, and free global LDEV entry management information 2054. Each global LDEV entry 2053 corresponds to each global LDEV.

Free global LDEV number management information 2051 consists of information for management free global LDEV numbers, and is in the form of a bit map, for example. In the present embodiment, global LDEV numbers contain a local LDEV number as shown in FIG. 7B, and free local LDEV numbers able to be correlated to global LDEV are managed in free global LDEV management information 2051. More specifically, global LDEV numbers are composed of, for example, a local LDEV number, a module number and a generation number as shown in FIG. 7B. The module number is the number of the storage system module 111 that has generated the global LDEV corresponding to this global LDEV number. The generation number is a number representing the generation of the global LDEV. For example, when a storage system module 111 has defined (generated) a first global LDEV correlated to a certain local LDEV, reboots and then defines a second global LDEV correlated to the same local LDEV (the certain local LDEV mentioned above), the generation number contained in the second global LDEV number differs from the generation number contained in the first global LDEV number. Furthermore, the time and date a global LDEV is defined, for example, can be used as another type of non-duplicated code instead of a generation number.

Figure 5B:
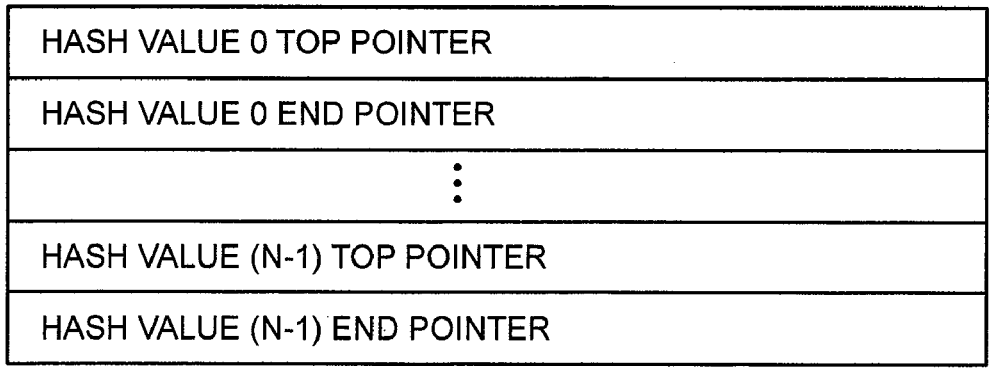
FIG. 5B shows a configuration of a global LDEV directory.

Global LDEV directory 2052 consists of information serving as an index of global LDEV entries. As shown in FIG. 5B, global LDEV directory 2052 is composed of a plurality of directory elements respectively corresponding to a plurality of hash values. A "hash value" here refers to a hash value of a global LDEV number. A [top pointer] and an [end pointer] are contained in the directory elements. The [top pointer] is the first pointer of the directory elements, while the [end pointer] is the last pointer of the directory elements.

Global LDEV entries 2053 consist of information relating to global LDEV corresponding to these global LDEV entries. In the subsequent description of this paragraph, a global LDEV corresponding to a global LDEV entry is referred to as a "subject global LDEV". As shown in FIG. 6A, a [global LDEV number], [module number], [local LDEV number], [target processor information], [backward pointer] and [forward pointer] are contained in a global LDEV entry 2053. The [global LDEV number] is the number of the subject global LDEV. The [module number] is a number for identifying a storage system module 111 having a local LDEV correlated to the subject global LDEV. A module number is set in S108 of device definition program 151 shown in FIG. 12 for the [module number] in a global LDEV entry in the storage system module in which the local LDEV correlated to the subject global LDEV is present. In addition, a number of the result inquired in S113 is set in S115 of path definition program 159 shown in FIG. 13 for the [module number] in a global LDEV entry in a storage system module in which the local LDEV correlated to the subject global LDEV is not present. The [local LDEV number] is the number of the local LDEV correlated to the subject global LDEV. The [local LDEV number] is contained in the global LDEV entry in the case that local LDEV is present in the current module 111. [Target processor information] consists of information for identifying a processor 147 in another module 111 having the local LDEV correlated to the subject global LDEV. Thus, the [target processor information] is contained in a global LDEV entry in the case that local LDEV is present in another module 111. The [backward pointer] is a pointer for representing another global LDEV entry behind and closest to a global LDEV entry, or an [end pointer] of a directory element to which a global LDEV entry is connected. The [forward pointer] is a pointer for representing another global LDEV entry in front of and closest to a global LDEV entry, or a [forward pointer] of a directory element to which a global LDEV entry is connected.

Free global LDEV entry management information 2054 consists of information for managing free global LDEV entries. As shown in FIG. 6B, free global LDEV entry management information 2054 contains a [free entry top pointer], [free entry end pointer] and the [number of free entries]. Free global LDEV entries are managed using a cueing system, for example. The [free entry top pointer] is the first pointer of the free global LDEV entries. The [free entry end pointer] is the last pointer of the free global LDEV entries. The [number of free entries] is the number of free global LDEV entries.

Figure 7A:
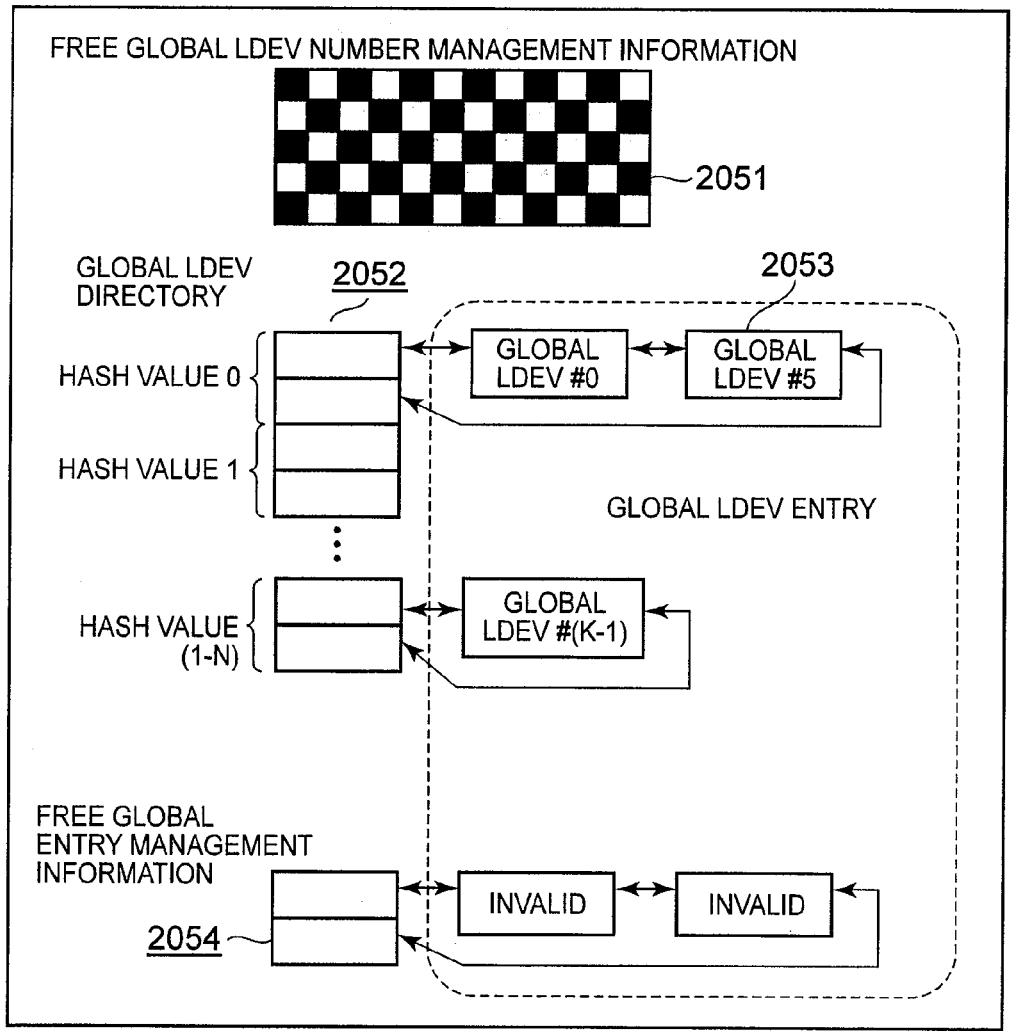
FIG. 7A indicates the concept of global LDEV management information.
Figure 7B:
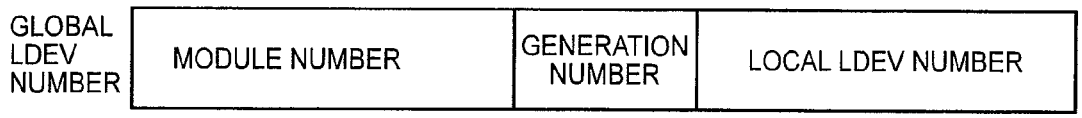
FIG. 7B shows a configuration of a global LDEV number.

FIG. 7A indicates the concept of global LDEV management information 205.

A free local LDEV number is specified by accessing free global LDEV number management information 2051, and a global LDEV number is generated that contains that specified local LDEV number.

A free global LDEV entry (block indicated with "invalid" in FIG. 7A) is specified by accessing free global LDEV entry management information 2054.

A hash value is calculated for the generated global LDEV number, and the specified free global LDEV entry is correlated to the directly element corresponding to the hash value either directly or indirectly (between another local LDEV and still another local LDEV). A predetermined number of information elements are contained in that free global LDEV entry.

As can be understood from FIG. 7A, global LDEV may have the same hash value even though their global LDEV numbers are different.

FIG. 8A shows a configuration of local LDEV management information 207.

Local LDEV management information 207 consists of information relating a plurality of local LDEV present in the current module 111. Local LDEV management information 207 is composed of a plurality of local LDEV entries 2071. Each local LDEV entry 2071 corresponds to each local LDEV possessed by the current module 111.

FIG. 8B shows a configuration of a local LDEV entry 2071. In the following explanation of FIG. 8B, the local LDEV corresponding to this local LDEV entry 2071 is referred to as the "subject local LDEV".

A [local LDEV number], [global LDEV number], [PDEV path number], [RAID group number], [top address], [end address], [capacity], [volume attribute] and [status] are contained in a local LDEV entry 2071. The [local LDEV number] is the number of the subject local LDEV. The [global LDEV number] is the number of a global LDEV correlated to the subject local LDEV. The [PDEV path number] is a number for representing a path to each PDEV serving as the basis of the subject local PDEV. The [RAID group number] is a number of RAID group (group in accordance with the Redundant Array of Independent (or Inexpensive) Disks) composed of a plurality of PDEV 112) having the subject local LDEV. The [top address] is the first address of consecutive areas corresponding to the subject local LDEV in the RAID group. The [end address] is the last address of those consecutive areas. The [capacity] is the storage capacity of the subject local LDEV. The [volume attribute] is the attribute (type) of the subject local LDEV. The [status] is the status of the subject local LDEV. Examples of [status] include "normal" meaning that the local LDEV is normal, and "blocked" meaning that the local LDEV cannot be accessed.

FIG. 9A shows a configuration of PDEV management information 209.

PDEV management information 209 consists of information relating to a plurality of PDEV 112 present in the current module 111. PDEV management information 209 is composed of a plurality of PDEV entries 2091. Each PDEV entry 2091 corresponds to each PDEV 112 possessed by the current module 111.

FIG. 9B shows a configuration of a PDEV entry 2091. In the following explanation of FIG. 9B, the PDEV corresponding to this PDEV entry 2091 is referred to as the "subject PDEV".

A [PDEV number], [PDEV path number], [RAID group number], [PDEV status] and [capacity] are contained in a PDEV entry 2091. The [PDEV number] is the number of the subject PDEV. The [PDEV path number] is a number representing a path to the subject PDEV. The [RAID group number] is the number of the RAID group containing the subject PDEV. The [PDEV status] is the status of the subject PDEV (such as "blocked" or "normal"). The [capacity] is the storage capacity of the subject PDEV.

FIG. 10A shows a configuration of module installation management information 213.

Module installation management information 213 consists of information relating to J storage system modules 111. Module installation management information 213 is composed of J module entries 2131. Each module entry 2131 corresponds to each storage system module 111.

FIG. 10B shows a configuration of a module entry 2131. In the following explanation of FIG. 10B, the storage system module corresponding to this module entry 2131 is referred to as the "subject module".

[Installation], [status] and [target processor information] are contained in a module entry 2131. [Installation] represents whether the subject module 111 is installed or uninstalled. [Status] represents the status of the subject module (such as "normal" or "blocked"). [Target processor information] consists of information relating to a target processor for the subject module 111 present in another module 111. Although this [target processor information] may be the same as the [target processor information] shown in FIG. 6A, it is different in the present embodiment. More specifically, the [target processor information] shown in FIG. 10B consists of information relating to a plurality of target processors, while the [target processor information] shown in FIG. 6A consists of information relating to a single target processor. In the case an I/O request cannot be transferred to that single target processor, a different target processor is selected from the plurality of target processors represented by the [target processor information] shown in FIG. 10B, and the I/O request can be transferred to the selected different target processor.

FIG. 10C shows a configuration of configuration unit management information 215.

Configuration unit management information 215 consists of information relating to a plurality of configuration units of the current module 111. A "configuration unit" as referred to here may be in large units in the manner the front-end interface 125 or the processor package 161, or in small units in the manner of local memory 131, a port 129 or a processor 147. Configuration unit management information 215 is composed of a plurality of configuration unit entries 2151. Each configuration unit entry 2151 corresponds to each configuration unit of the current module 111.

FIG. 10D shows a configuration of a configuration unit entry 2151. In the following explanation of FIG. 10D, a configuration unit corresponding to this configuration unit entry 2151 is referred to as a "subject configuration unit".

[Installation], [status] and [number of failures] are included in a configuration unit entry 2151. [Installation] represents whether the subject configuration unit is installed or uninstalled. [Status] represents the status of the subject configuration unit (such as "normal" or "blocked"). [Number of failures] is the count value of the number of failures detected for the subject configuration unit.

FIG. 11A shows a configuration of data migration management information 217.

Data migration management information 217 consists of data relating to data migration. Data migration management information 217 is composed or one or a plurality of data migration entries 2171. Each data migration entry 2171 corresponds to each data migration.

FIG. 11B shows a configuration of a data migration entry 2171. In the following explanation of FIG. 11B, a data migration corresponding to this data migration entry 2171 is referred to as a "subject data migration".

A [source global LDEV number], [target global LDEV number], [migration status] and [migration data transfer progress pointer] are contained in a data migration entry 2171. The [source global LDEV number] is the number of a source global LDEV of the data in the subject data migration. The [target global LDEV number] is the number of the target global LDEV of the data in the subject data migration. The [migration status] is the status of data migration (such as "in progress" or "completed"). The [migration data transfer progress pointer] is a pointer representing the progress of the subject data migration, and more specifically, is a pointer representing the degree to which data migration from the first source global LDEV has been completed.

The following provides an explanation of the operation of each computer program. Furthermore, in the following explanation, a storage system module having a processor 147 that executes the subject computer program described in the explanation is referred to as the "current module", and a storage system module 111 other than the current module 111 is referred to as "another module".

FIG. 12 is a flow chart of the operation of the device definition program 151.

The device definition program 151 is initiated in the case the current module 111 has received a device definition request from a maintenance terminal 113 or the management terminal 107.

The device definition program 151 transmits information representing one or a plurality of free PDEV areas and one or a plurality of free local LDEV numbers to a maintenance terminal 113 or management terminal 107 (S101). As a result, information representing one or a plurality of free PDEV areas and one or a plurality of free local LDEV numbers are displayed on a display device (not shown) possessed by a maintenance terminal 113 or management terminal 107. Furthermore, the "free PDEV area" refers to a storage area in a RAID group not yet used as a local LDEV. The device definition program 151 specifies a free PDEV area by accessing global LDEV management information 205 (and particularly [RAID group number], [top address] and [end address] in local LDEV entry 2071) and PDEV management information 209. In addition, device definition program 151 specifies a free local LDEV number by, for example, accessing the setting status of local LDEV entry 2071 of local LDEV management information 207.

The device definition program 151 creates a local LDEV entry 2071 containing information representing a designated PDEV area among one or a plurality of PDEV areas, and a designated local LDEV number among one or a plurality of local LDEV numbers, and adds it to local LDEV management information 207 (S102). Furthermore, the "designated PDEV area" and "designated local LDEV number" are a PDEV area and local LDEV number designated by an operator of a maintenance terminal 113 or management terminal 107.

The device definition program 151 generates a global LDEV number containing the designated local LDEV number (S103).

The device definition program 151 judges whether or not the generated global LDEV number is already in use (S104). If a global LDEV number identical to the generated global LDEV number is contained in global LDEV management information 205, the generated global LDEV number is judged to be in use in S104 (Y in S104), and judges it to not be in use if it is not contained in global LDEV management information 205 (N in S104).

In the case of Y in S104, the device definition program 151 generates a different global LDEV number by a method such as accessing free global LDEV number management information 2051 and specifying a free global LDEV number (S105). In this S105, a global LDEV number is generated that is not present in global LDEV management information 205.

The device definition program 151 transmits the global LDEV number generated in S103 or S105 to a maintenance terminal 113 or management terminal 107 (S106). As a result, the global LDEV number is displayed on a display device (not shown) possessed by the maintenance terminal 113 or management terminal 107. The device definition program 151 executes S108 if the transmitted global LDEV number is designated by maintenance terminal 113 or management terminal 107 (Y in S107), or executes S105 if it is not designated (N in S107).

In S108, the device definition program 151 selects a single free global LDEV entry by accessing free global LDEV entry management information 2054, and includes the designated global LDEV number in the selected free global LDEV entry.

In S109, the device definition program 151 connects the global LDEV entry containing the designated global LDEV number to a global LDEV directory 2052. Furthermore, the connection target is a directory element corresponding to the hash value of the designated global LDEV number, or another global LDEV entry 2053 connected directly or indirectly to that directory element. In addition, the device definition program 151 includes the designated global LDEV number in the above-mentioned local LDEV entry.

Figure 13:
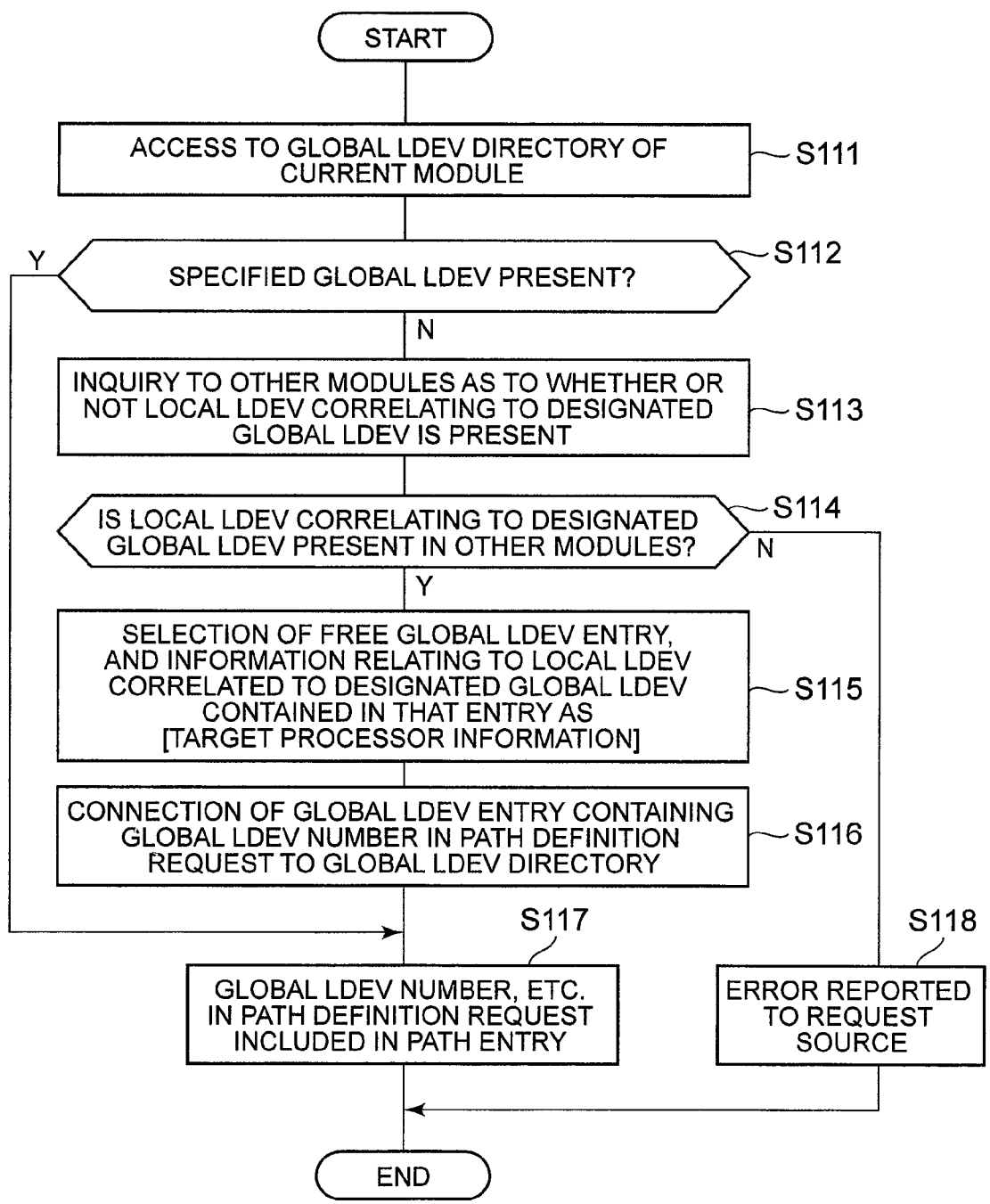
FIG. 13 is a flow chart of the operation of a path definition program.

FIG. 13 is a flow chart of the operation of the path definition program 159.

The path definition program 159 is initiated in the case the current module 111 has received a path definition request from a maintenance terminal 113 or management terminal 107. A port number, LUN and global LDEV number, for example, are contained in a path definition request.

The path definition program 159 accesses the global LDEV directory 2052 of global LDEV management information 205 of the current module (S111), and judges whether or not a global LDEV identified on the basis of a global LDEV number (to be referred to as a "designated global LDEV" in the explanation of FIG. 13) is present in the path definition request (S112). If the global LDEV number in the path definition request is contained in global LDEV management information 205, an affirmative judgment results (Y in S112), while if it is not contained in global LDEV management information 205, a negative judgment results (N in S112).

In the case of Y in S112, the path definition program 159 is able to execute S117 without executing S113 to S116 described hereinafter (namely, a path entry 2011 containing the port number, LUN and global LDEV number in the path definition request is added to path management information 201). This is because, since a local LDEV correlating to the designated global LDEV is either in the current module 111 or is in another module but the path or data target has already been defined, a [local LDEV number] or [target processor information] is contained in the global LDEV entry 2053 corresponding to the designated global LDEV, thereby eliminating the need to create a new global LDEV entry 2053.

In the case of N in S112, the path definition program 159 inquires as to whether or not the local LDEV correlating to the designated global LDEV is present in another module 111 (S113), and judges that result (S114). If a local LDEV entry 2071 containing the number of the designated global LDEV is present in local LDEV management information 207 in another module 111, an affirmative judgment results (Y in S114), while if it is not present, a negative judgment results (N in S114). In the case of N in S114, the path definition program 159 reports an error to the path definition transmission source (request source) (S118).

In the case of Y in S114, the path definition program 159 executes S117 as described above after first executing S115 and S116.

In S115, the path definition program 159 selects a single free global LDEV entry by accessing free global LDEV entry management information 2054. This is because the global LDEV entry corresponding to the designated global LDEV is still not contained in global LDEV management information 205 of the current module 111.

In addition, in S115, the path definition program 159 includes information relating to a processor 147 in another module 111 having a local LDEV correlating to the designated global LDEV in the above-mentioned selected free global LDEV entry in the form of [target processor information]. This [target processor information] can be generated based on, for example, [target processor information] in a module entry 2131 corresponding to the current module 111.

In S116, the path definition program 159 includes a global LDEV number in the path definition request in the selected global LDEV entry, and connects that global LDEV entry to global LDEV directory 2052. Subsequently, the path definition program 159 executes S117 as previously described.

Figure 14:
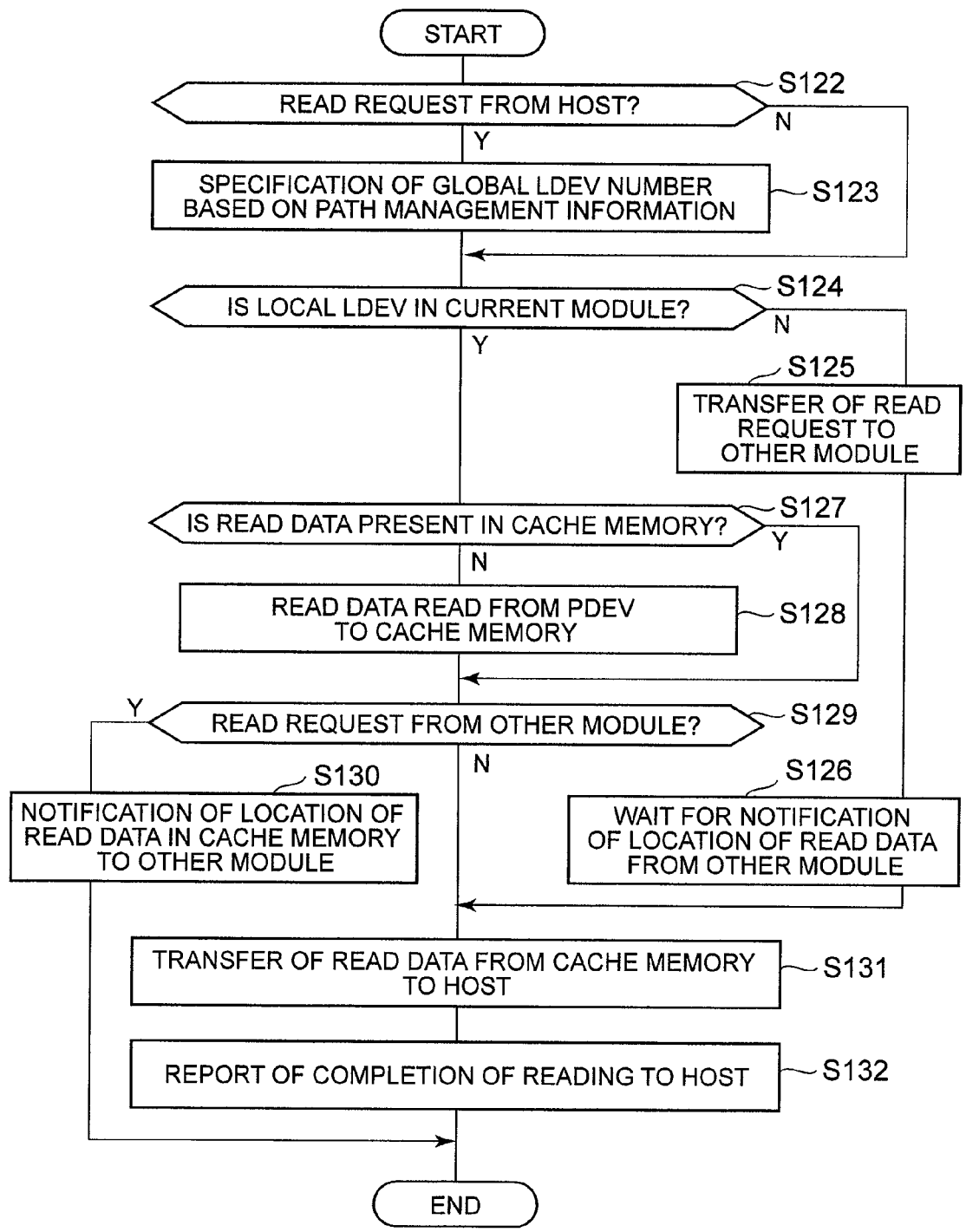
FIG. 14 is a flow chart of the operation of a read program.

FIG. 14 is a flow chart of the operation of the read program 153.

The read program 153 is initiated in the case the current module 111 has received a read request from the host 101 or another module 111.

The read program 153 executes S123 if the received read request is a read request from the host 101 (Y in S122), or executes S124 without executing S123 if the received read request is a read request from another module 111 (N in S122). In this case, for example, a subject global LDEV number to be described to follow may be allowed to be specified in the target of the read request as a result of the source of the read request notifying the target of the read request of a global LDEV number specified in S123. Alternatively, for example, S123 may be allowed to be carried out regardless of whether or not the received read request is a read request from the host 101.

In S123, the read program 153 specifies a global LDEV number corresponding to the port number and LUN specified in the received read request from path management information 201.

Figure 15:
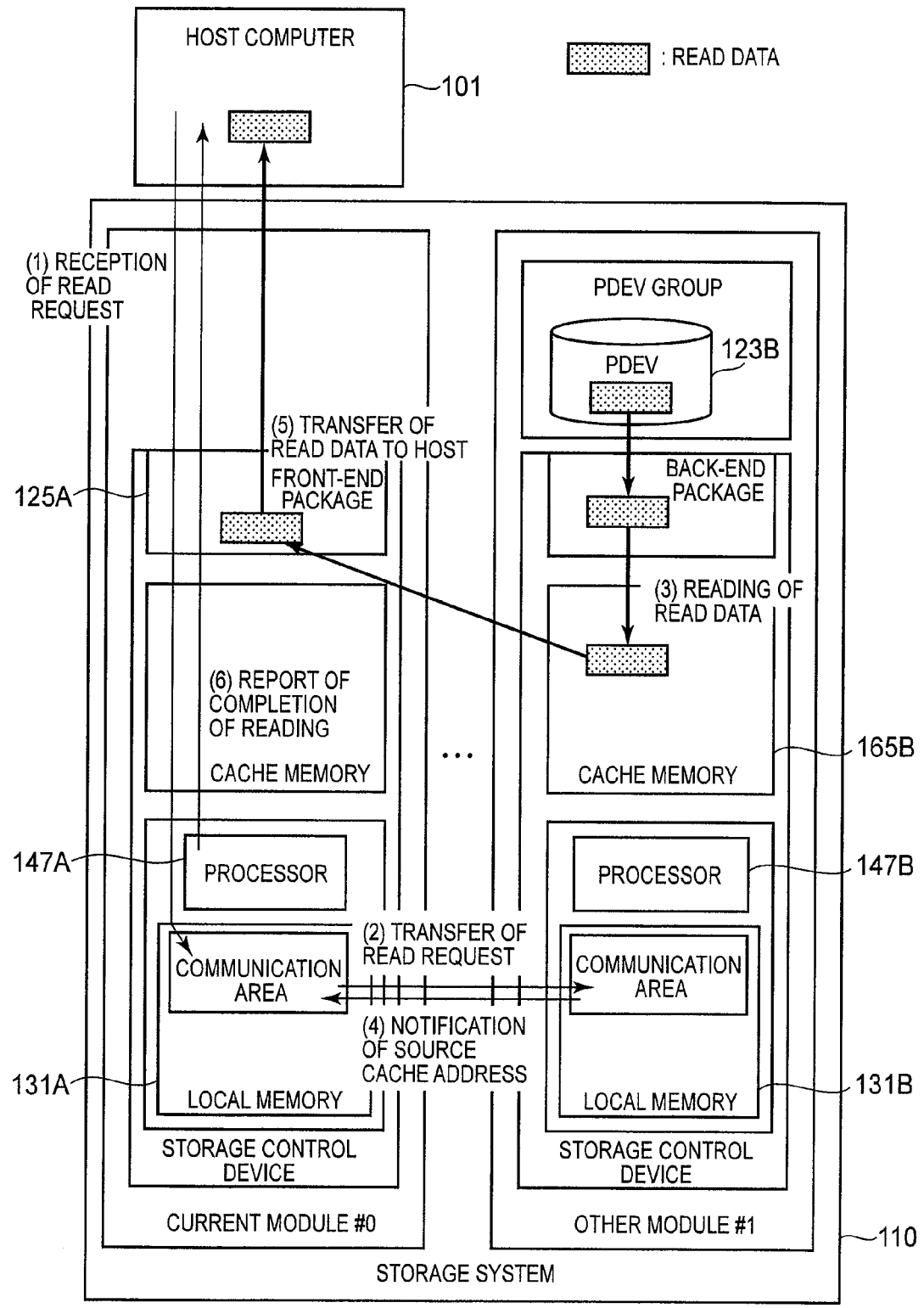
FIG. 15 shows a summary of the flow of read data transfer in the case of a module having received a read request from a host and then transferring that read request to another module.

In S124, the read program 153 judges whether or not the local LDEV correlating to the global LDEV corresponding to the specified global LDEV number (to be referred to as the "subject global LDEV" in the explanation of FIGS. 14 and 15) is present in the current module. If a [local LDEV number] is contained in a global LDEV entry 2053 corresponding to the subject global LDEV, an affirmative judgment results (Y in S124), while if [target processor information] is contained, a negative judgment results (N in S124).

In the case of N in S124, the read program 153 transfers the received read request to a processor 147 in another module 111 (to be referred to as the "target processor") specified by the [target processor information] in the global LDEV entry 2053 corresponding to the subject global LDEV (S125). The read program 153 then waits for notification of the location of read data from another module 111 of the target of the read request (target processor 147) (S126).

In the case of Y in S124, the read program 153 judges whether or not read data is present in cache memory 165 of the current module 111 (S127). If the result of the judgment is negative (N in S127), the read program 153 reads the read data from a PDEV 112 serving as the basis of a local LDEV in the current module 111 (local LDEV correlating to the subject global LDEV), and then writes the read data to cache memory 165 (S128).

If the received read request is a read request from another module 111 (Y in S129), the read program 153 notifies the other module 111 that is the source of the read request of the location of read data (S130).

On the other hand, in the case of N in S129 or in the case S126 is executed, the read program 153 transmits the read data to the host 101 (S131) and reports completion of reading to the host 101 (S132). The read data transmitted to the host 101 is read data written to cache memory 165 in the current module 111 in the case of S131 for the case of N in S129, while in the case of S131 for the case of having been notified of the location of read data in S126, the read data is that which has been acquired from the notified location in another module 111 that is the target of the read request.

FIG. 15 shows a summary of the flow of read data transfer in the case of the current module 111 having received a read request from the host 101 and then transferring that read request to another module 111. In the explanation of FIG. 15, the number of the current module 111 is #0, and the number of the other module 111 is #1. In addition, an "A" is attached to the end of reference numbers of configuration units in the current module #0, while a "B" is attached to the end of reference numbers of configuration units in the other module #1. The following provides an explanation of steps (1) to (6) shown in FIG. 15.

(Step (1)) Current module #0 receives a read request from the host 101, and the received read request is written to a communication area within local memory 143A. A "communication area" refers to a storage area where data communicated between storage system modules 111 is stored.

(Step (2)) The read request written to the communication area in local memory 143A is transferred to a target processor 147B in the other module #1. The read request received by the target processor 147B is then written to a communication area in local memory 143B by the target processor 147B.

(Step (3)) Read data is read from PDEV 123B serving as the basis of a local LDEV correlating to the subject global LDEV by a read program executed in the target processor 147B (to be referred to as "read program 153B"), and that read data is written to cache memory 165B.

(Step (4)) The location of read data in cache memory 165B (to be referred to as the "source cache address") is notified to source processor 147A in the current module #0 via respective communication areas in local memory 143B and 143A by the read program 153B.

(Step (5)) The source cache address is set in a front-end package 125A (such as a DMA circuit in that package 125A) by a read program executed by source processor 147A (to be referred to as "read program 153A"). Read data is read from the source cache address, namely the location of read data in cache memory 165B, by the front-end package 125A, and that read data is transmitted to the host 101 from the front-end package 125A.

(Step (6)) Completion of reading is reported to the host 101 by the read program 153A.

As has been described above, data transfer between storage system modules 111 is not realized by a source module 111 writing data to a target module 111, but rather is realized by a target module 111 reading data from a location notified by a source module 111. As a result, mistaken destruction of data in a target module 111 by a source module 111 can be avoided. This is similar to write data transfer accompanying a write request being transferred between storage system modules 111 and data transfer accompanying data migration between storage system modules 111 instead of data read data transfer accompanying a read request being transferred between storage system modules 111 alone.

Figure 16:
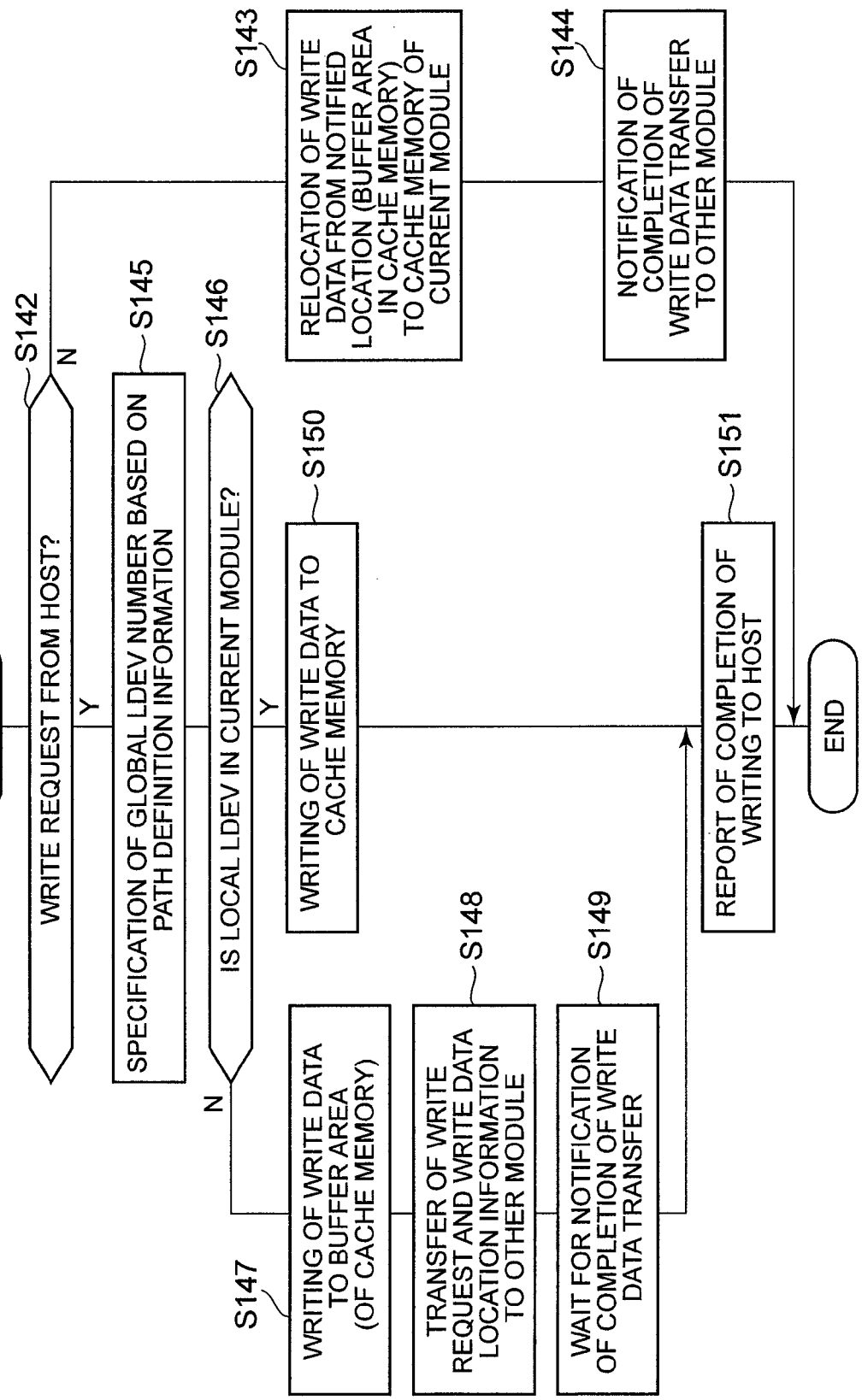
FIG. 16 is a flow chart of the operation of a write program.

FIG. 16 is a flow chart of the operation of the write program 157.

The write program 157 is initiated in the case a write request has been received by the current module 111 from the host 101 or another module 111.

The write program 157 executes steps S145 and beyond if the received write request is a write request from the host 101 (Y in S142), or executes S143 and S144 if the received write request is a write request from another module 111 (N in S142).

In S143, the write program 157 relocates write data from the location in a buffer area in cache memory 165 possessed by another module 111 as notified by another module 111 that is the source of the write request to cache memory 165 of the current module 111.

In S144, the write program 157 notifies the other module 111 that is the source of the write request that transfer of write data has been completed.

In S145, the write program 157 specifies a global LDEV number corresponding to the port and LUN designated in the received write request from path management information 201.

In S146, the write program 157 judges whether or not a local LDEV correlating to the global LDEV corresponding to the specified global LDEV number (to be referred to as the "subject global LDEV" in the following explanation of FIGS. 16 and 17) is present in the current module. If a [local LDEV number] is contained in the global LDEV entry 2053 corresponding to the subject global LDEV, an affirmative judgment results (Y in S146), while if it is contained in [target processor information], a negative judgment results (N in S146).

In the case of N in S146, the write program 157 writes the write data according to the write request to a buffer area in cache memory 165 possessed by the current module 111 (S147). The write program 157 transfers the received write request and write data location information (source cache address) to the processor 147 in another module 111 (to be referred to as the "target processor") specified by [target processor information] in the global LDEV entry 2053 corresponding to the target global LDEV (S148). The write program 157 then waits for a notice of completion of write data transfer from the target other module 111 (target processor 147) (S149).

In the case of Y in S146, the write program 157 writes the write data to cache memory 165 in the current module 111 (S150). Write data written to cache memory 165 is written to PDEV 112 serving as the basis of the local LDEV correlating to the target global LDEV from cache memory 165 by the write program 157 asynchronously with S150 (or synchronously with S150).

Following S149 or S150, the write program 157 reports completion of writing to the host 101 (S151).

Figure 17:
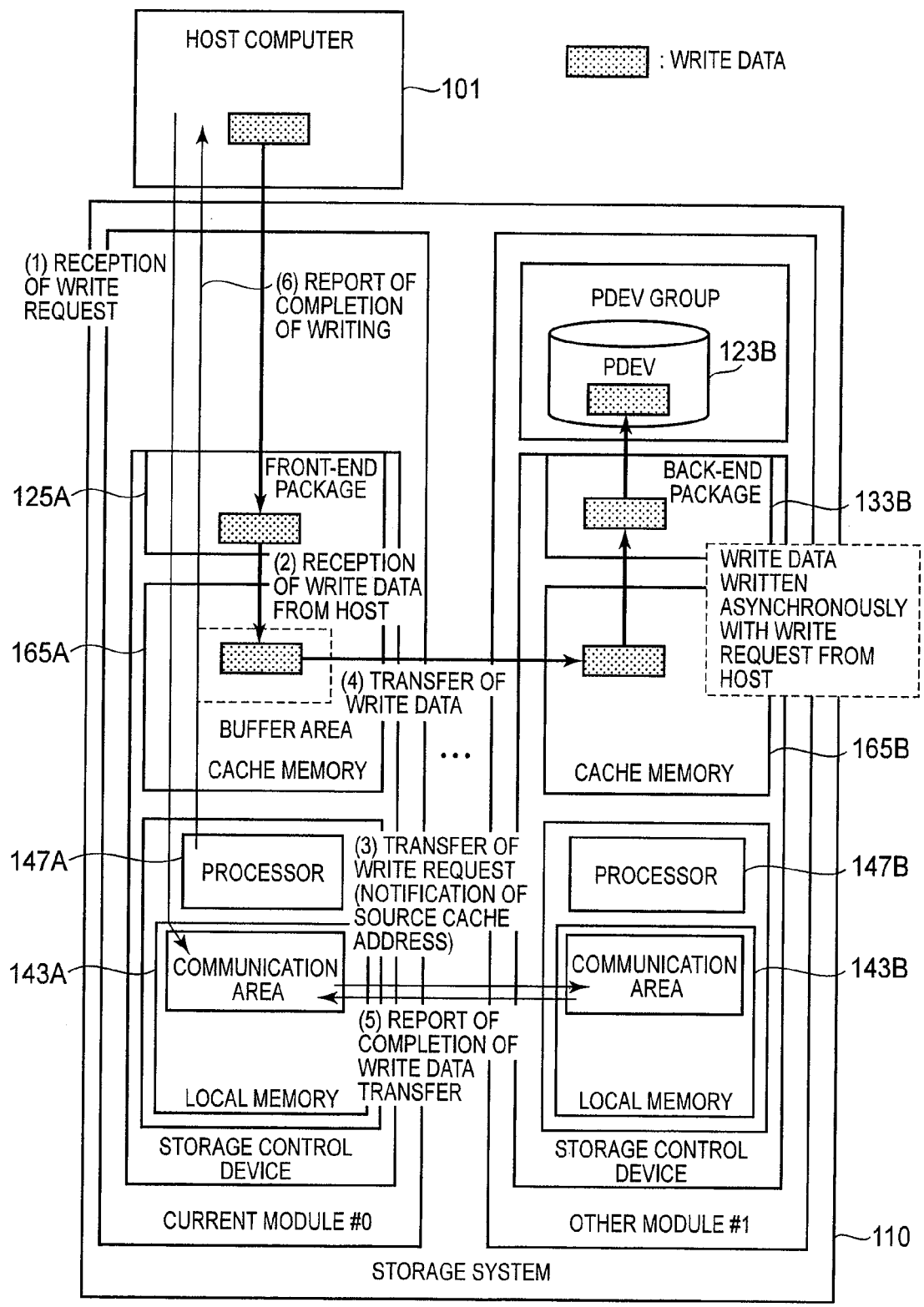
FIG. 17 shows a summary of the flow of write data transfer in the case of a module having received a write request from a host and then transferring that write request to another module.

FIG. 17 shows a summary of the flow of write data transfer in the case of the current module 111 receiving a write request from the host 101 and then transferring that write request to another module 111. In the explanation of FIG. 17, the number of the current module 111 is #0, and the number of the other module 111 is #1 in the same manner as FIG. 15. In addition, an "A" is attached to the end of reference numbers of configuration units in the current module #0, while a "B" is attached to the end of reference numbers of configuration units in the other module #1. The following provides an explanation of steps (1) to (6) shown in FIG. 17.

(Step (1)) The current module #0 receives a write request from the host 101, and the received write request is written to a communication area within local memory 143A.

(Step (2)) The current module #0 receives write data according to the write request from the host 101, and the received write data is written to a buffer area within cache memory 165A by a write program executed by source processor 147A (to be referred to as "write program 157A").

(Step (3)) The write request written to the communication area within the local memory 143A and information indicating the location of the write data in the buffer area of cache memory 165A in the form of a source cache address are transferred to a target processor 147B in another module #1 by the write program 157A. The write request and the source cache address received by the target processor 147B are written to a communication area within local memory 143B by the target processor 147B.

(Step (4)) The source cache address stored in the communication area of local memory 143B, namely write data from the buffer area within cache memory 165A, is read by a write program executed by the target processor 147B (to be referred to as "write program 157B")), and then written to cache memory 165B. The write data written to cache memory 165B is written to PDEV 112 serving as the basis of the local LDEV correlating to the target global LDEV from the cache memory 165B asynchronously with completion of step (4) (or synchronously with completion of step (4)).

(Step (5)) Completion of transfer of write data is reported to the source processor 147A by the write program 157B.

(Step (6)) Completion of writing is reported to the host 101 by the write program 157A.

Figure 18:
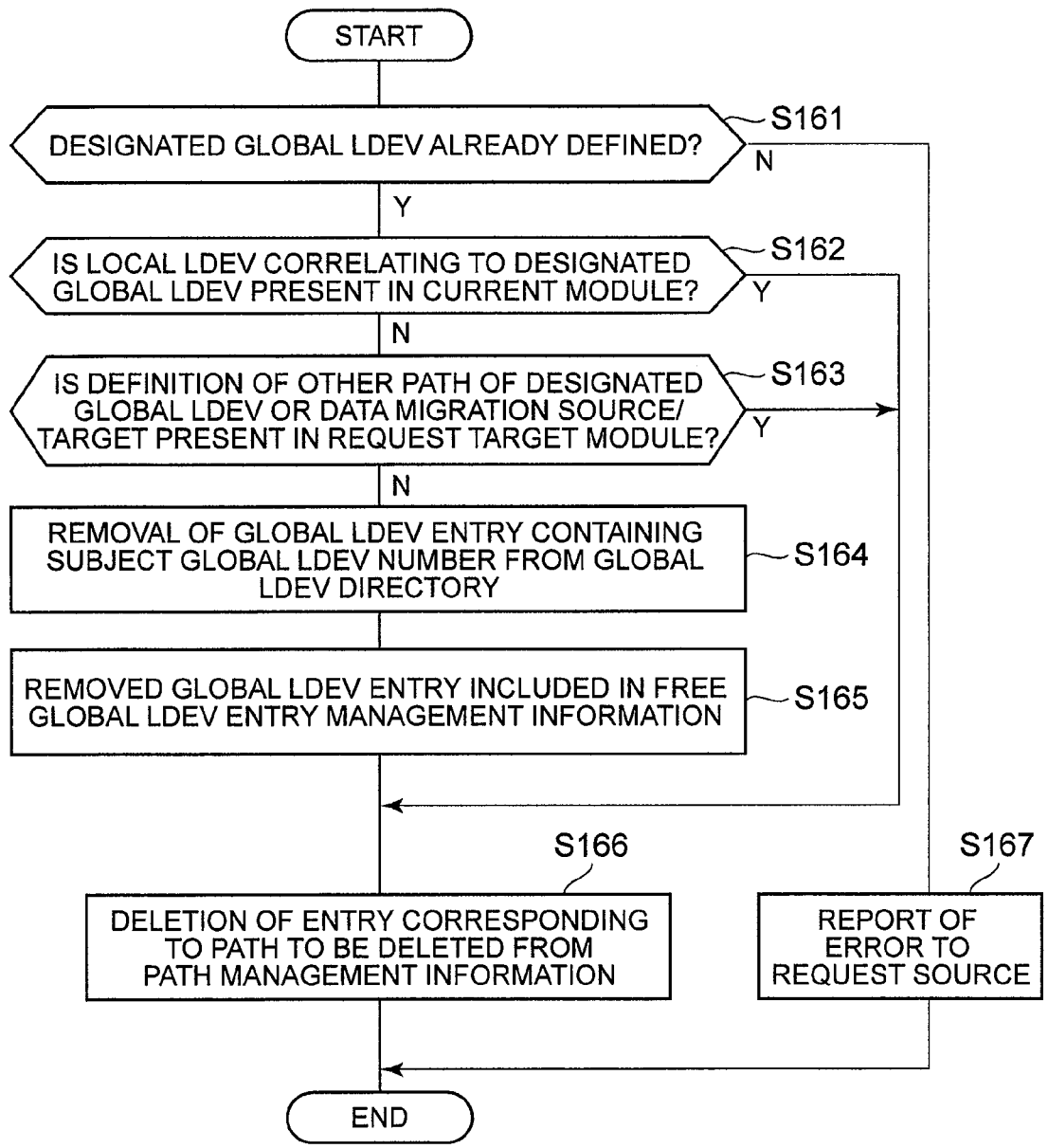
FIG. 18 is a flow chart of the operation of a path deletion program.

FIG. 18 is a flow chart of the operation of the path deletion program 158.

The path deletion program 158 is initiated in the case the current module 111 has received a path deletion request from a maintenance terminal 113 or management terminal 107. A port number, LUN and global LDEV number, for example, are contained in a path deletion request.

The path deletion program 158 judges whether or not a global LDEV identified by a global LDEV number in the path deletion request (referred to as the "designated global LDEV" in the explanation of FIG. 18) has been defined (S161). If the global LDEV number contained in the path deletion request is contained in global LDEV management information 205, an affirmative judgment results (Y in S161), while if it is not contained, a negative judgment results (N in S161). In the case of N in S161, the path deletion program 158 reports an error to the source of the path deletion request (request source) (S167).

In the case of Y in S161, the path deletion program 158 judges whether or not the local LDEV correlating to the specified global LDEV is present in the current module 111 (S162). If a local LDEV entry 2071 containing the specified global LDEV number is present in local LDEV management information 207, an affirmative judgment results (Y in S162), while if it is not, a negative judgment results (N in S162). In the case of Y in S162, the path deletion program 158 is able to execute S166 without executing S163 to S165 described to follow (namely, the path entry 2011 containing the port number, LUN and global LDEV number in the path deletion request can be deleted from path management information 201).

In the case of N in S162, path deletion program 158 judges whether or not another path leading to the specified global LDEV (path other than the path to be deleted) is present in the current module 111, and whether or not the specified global LDEV matches the data source/target (S163). If two or more path entries 2011 containing the global LDEV number in the path deletion request are present in path management information 201, or if one or more data migration entries 2171 containing the global LDEV number in the path deletion request are present in data migration management information 217, an affirmative judgment results (Y in S163), while if they are not, a negative judgment results (N in S163). In the case of Y in S163, the path deletion program 158 is able to execute the above-mentioned S116 without executing S164 and S165 described to follow. In the case of N in S163, the path deletion program 158 executes S166 after having executed S164 and 165.

In S164, the path deletion program 158 removes the global LDEV entry 2053 containing the global LDEV number in the path deletion request from global LDEV directory 2052.

In S165, the path deletion program 158 includes the global LDEV entry 2053 removed in S164 in free global LDEV entry management information 2054. Subsequently, the path deletion program 158 executes S166 as previously described.

Figure 19:
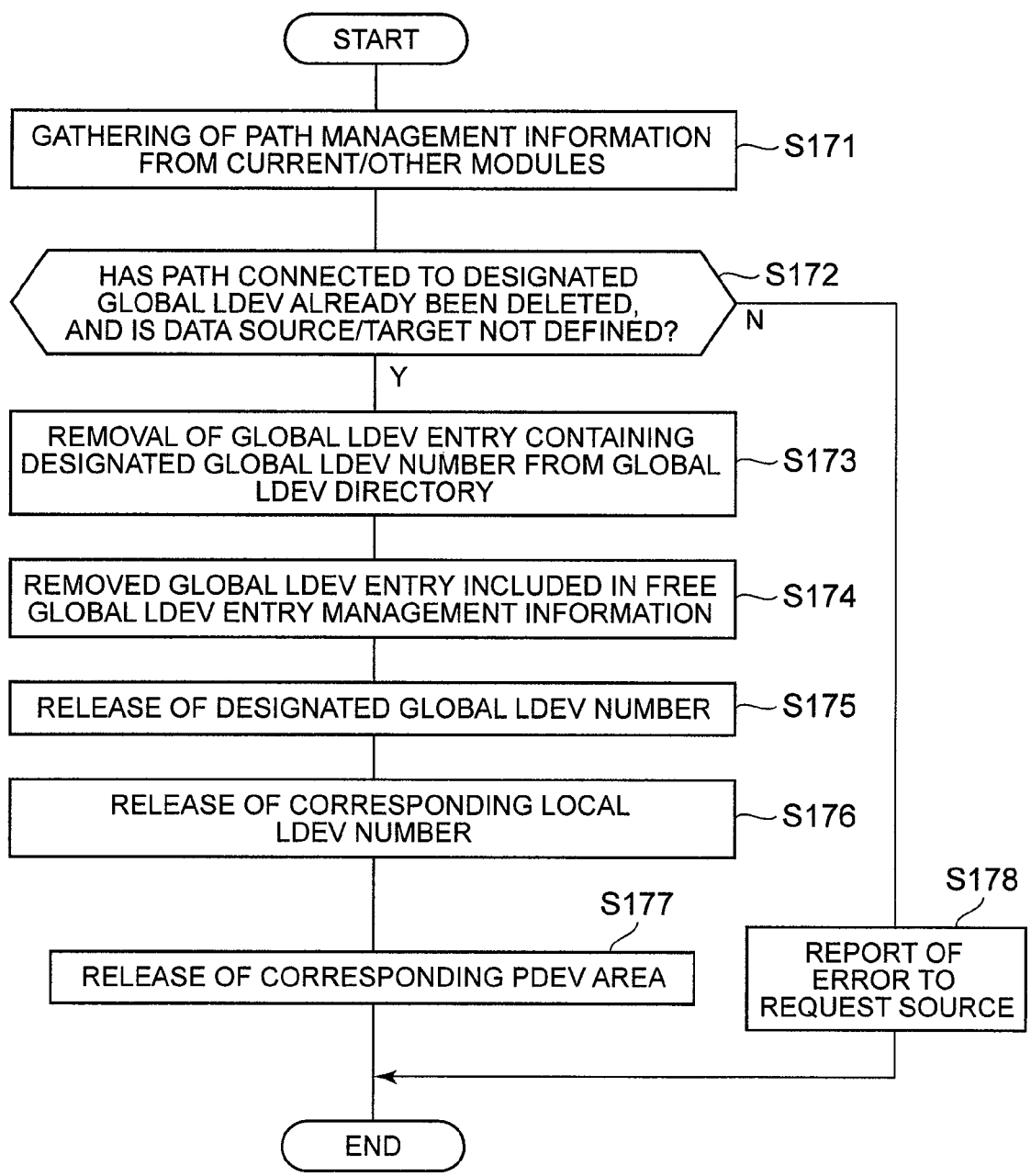
FIG. 19 is a flow chart of the operation of a device deletion program.

FIG. 19 is a flow chart of the operation of the device deletion program 152.

The device deletion program 152 is initiated in the case the current module 111 has received a device deletion request from a maintenance terminal 113 or management terminal 107. A global LDEV number, for example, is contained in the device deletion request.

The device deletion program 152 gathers path management information 201 from the current module 111 and all other modules 111 (S171).

The device deletion program 152 judges whether or not a path leading to the global LDEV identified by the global LDEV number in the device deletion request (to be referred to as the "specified global LDEV" in the explanation of FIG. 19) has been deleted in the current module 111 and all other modules 111, and whether or not the specified global LDEV matches the data source/target (S172). If a path entry 2011 containing the number of the specified global LDEV is not present in all of the gathered path management information 201, and a data migration entry 2171 containing the specified global LDEV is not present in data migration management information 217, an affirmative judgment results (Y in S172), while if there is even one path entry 2011 containing the number of the specified global LDEV, a negative judgment results (N in S172). In the case of N in S172, the device deletion program 152 reports an error to the source of the device deletion request (request source) (S178).

In the case of Y in S172, the device deletion program 152 removes global LDEV entry 2053 containing the global LDEV number in the device deletion request from global LDEV directory 2052 (S173). The device deletion program 152 includes the global LDEV entry 2053 removed in S173 in free global LDEV entry management information 2054 (S174). The device deletion program 152 releases the global LDEV number in the device deletion request (S175), the number of the local LDEV corresponding to the specified global LDEV (S176), and the PDEV area corresponding to that local LDEV (S177). As a result of executing S175, the local LDEV of the released global LDEV number is managed by free global LDEV number management information 251 as a free LDEV. In addition, as a result of executing S176 and S177, the local LDEV entry 2071 corresponding to the local LDEV correlating to the specified global LDEV is deleted from local LDEV management information 207.

Figure 20:
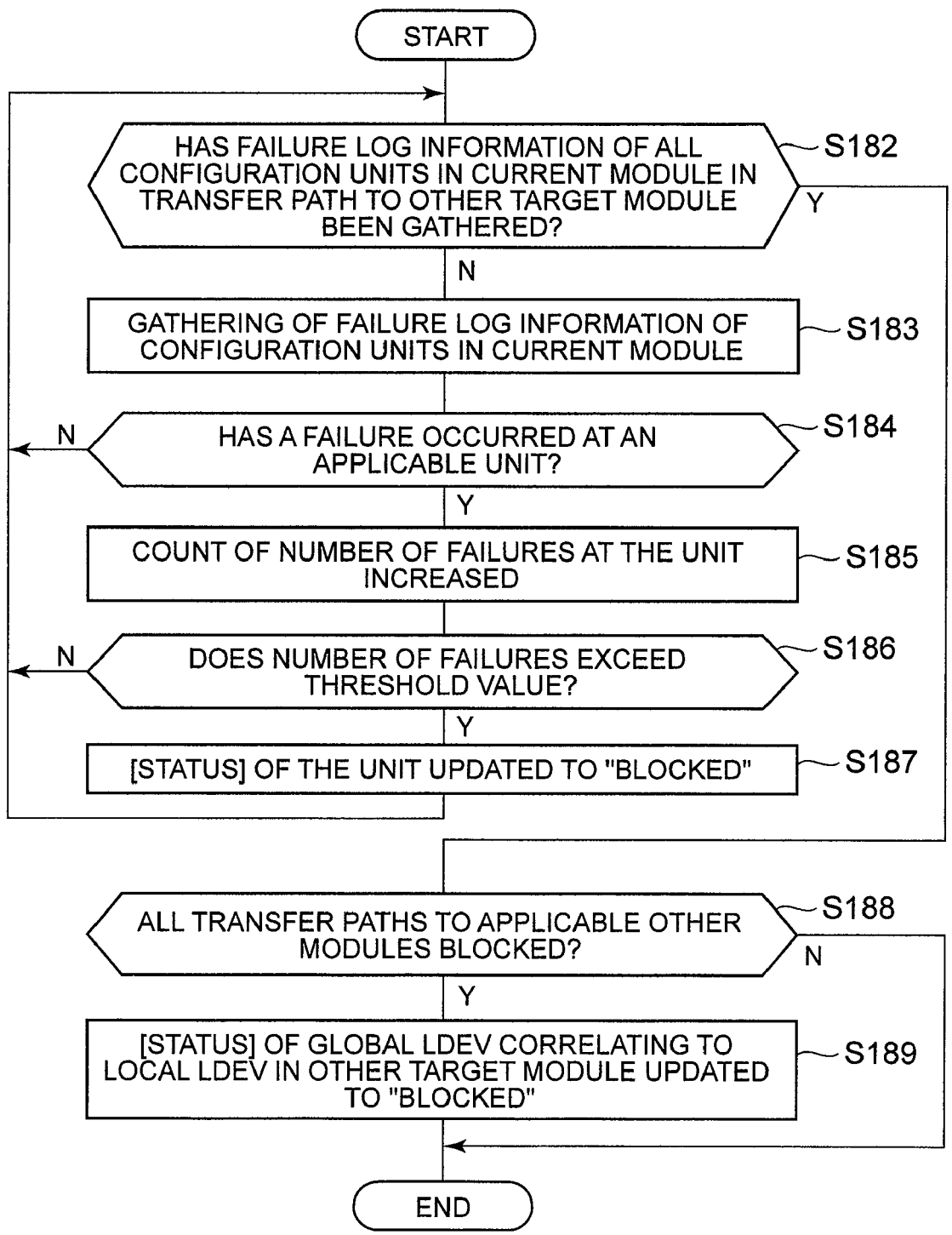
FIG. 20 is a flow chart of the operation of a fault blocking program.

FIG. 20 is a flow chart of the operation of the failure blocking program 156.

The failure blocking program 156 is initiated in the case a timeout (when a response is not received from another module 111 after a predetermined amount of time has elapsed after transfer) is detected by the current module 111 during transfer from the current module 111 to another module 111.

The failure blocking program 156 judges whether or not failure log information relating to all configuration units in the current module 111 in a transfer path to a target other module 111 has been gathered (S182).

In the case information has not been gathered (N in S182), the failure blocking program 156 gathers failure log information relating to configuration units in the current module 111 (S183). The failure blocking program 156 judges whether or not a failure has occurred in a certain configuration unit based on the failure log information (S184). If a failure has not occurred (N in S184), S182 is executed, while if a failure has occurred (Y in S184), the failure blocking program 156 increases the count of the [number of failures] in the configuration unit entry corresponding to the certain configuration unit (S185). If the counted [number of failures] does not exceed a predetermined threshold value (N in 186), S182 is executed, while if the threshold value is exceeded (Y in 186), the failure blocking program 156 updates the [status] in the configuration unit entry corresponding to the certain configuration unit to "blocked" (S187).

S183 to S187 as described above are executed for all configuration units in the current module 111 in the transfer path to the target other module, and a Y results in S182 when executed.

In the case of Y in S182, the failure blocking program 156 judges whether or not all transfer paths to the target other module 111 are blocked (S188). If the [status] of an element of the transfer path in the form of a configuration unit in the current module 111 is "blocked", that transfer path is blocked.

If all transfer paths to the target other module 111 are blocked, the failure blocking program 156 updates the [status] in the path entry 2011 containing the number of the global LDEV correlating to the local LDEV in the target other module 111 (path entry 2011 in path management information 201 in the current module 111) to "blocked". The number of the global LDEV correlating to the local LDEV in target other module 111 is, for example, a global LDEV number contained in the global LDEV entry 2053 containing [target processor information] representing a processor in the target other module 111 from global LDEV management information 205.

In addition, although not shown in the drawings, in the case of blocking a local LDEV present in the current module 111 in the case a failure has occurred in that local LDEV, the [status] of a path entry 2011 in another module 111 of a global LDEV correlating to that local LDEV need not necessarily be changed in response to blockage of that local LDEV. This is because, when the global LDEV correlating to that local LDEV is accessed from the other module 111, the blocked status of that local LDEV is detected, and the [status] of the path entry 2011 of the other module 111 is changed to blocked.

Figure 21:
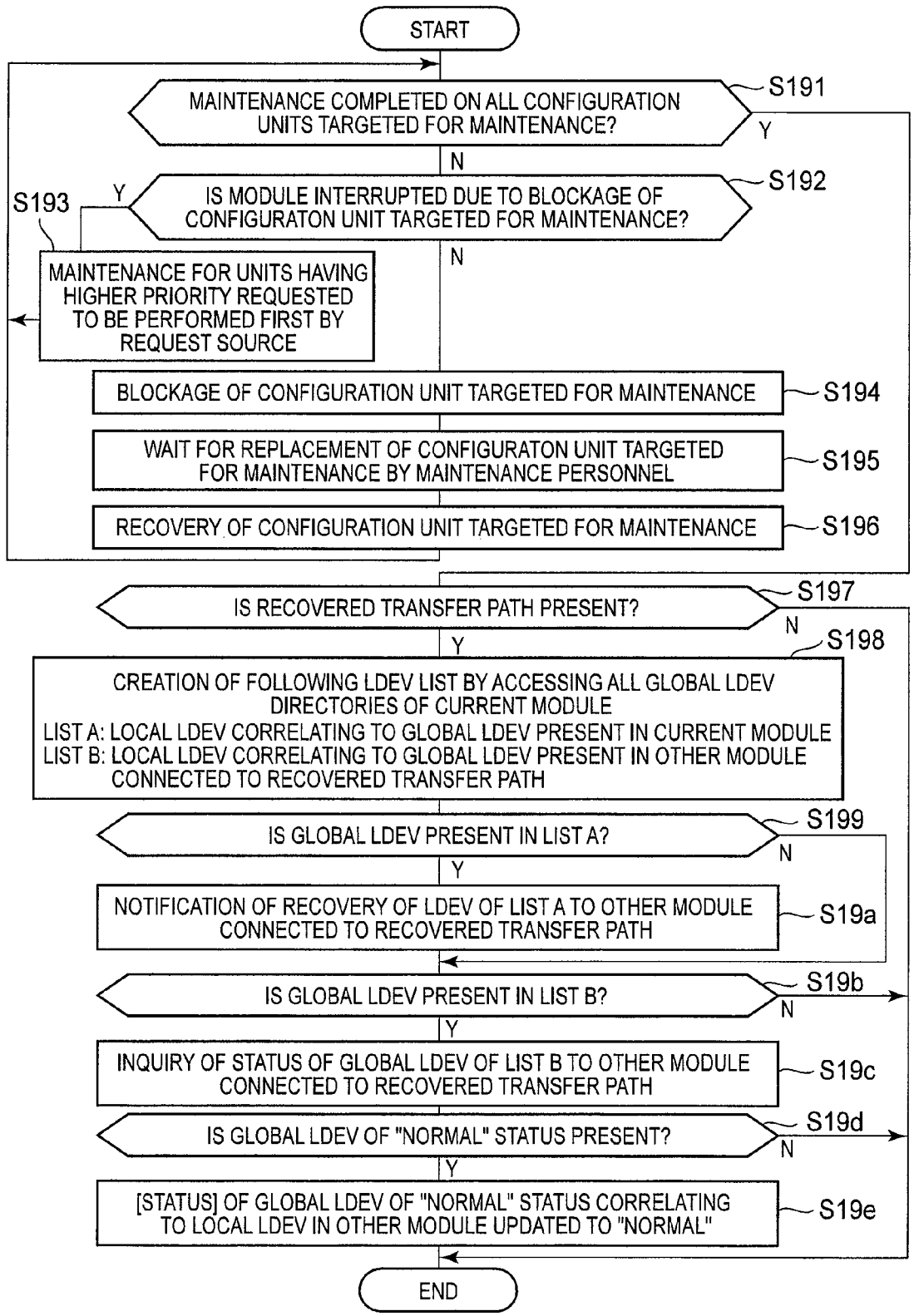
FIG. 21 is a flow chart of the operation of a fault recovery program.

FIG. 21 is a flow chart of the operation of the failure recovery program 154.

The failure recovery program 154 is initiated in the case the current module 111 has received a recovery request from a maintenance terminal 113 or management terminal 107.

The failure recovery program 154 judges whether or not maintenance has been completed on all configuration units targeted for maintenance within the current module 111 (S191).

In the case maintenance has not been completed (N in S191), the failure recovery program 154 judges whether or not the current module 111 is blocked when the configuration units targeted for maintenance are blocked (S192). If judged to be blocked (Y in S192), a request for maintenance to be performed first on a configuration unit of higher priority is made to a maintenance terminal 113 or management terminal 107 (S193). On the other hand, if judged to not be blocked (N in S192), a maintenance terminal 113 or management terminal 107 blocks the configuration unit targeted for maintenance (S194), waits for the configuration unit targeted for maintenance to be replaced by maintenance personnel (S195). Following replacement, the configuration unit targeted for maintenance is recovered (for example, by updating the [status] of the configuration unit targeted for maintenance from "blocked" to "normal") (S196).

The result of S191 becomes "Y" when S192 through S196 have been executed for all configuration units targeted for maintenance.

In the case of Y in S191, the failure recovery program 154 judges whether or not there is a transfer path (transfer path to another module) that has recovered as a result of recovering configuration units targeted for maintenance (S197).

If there is a recovered transfer path (Y in S197), the failure recovery program 154 accesses current module global LDEV directory 2052, and creates a list of global LDEV (S198). There are two types of global LDEV lists created. The first type is a list of numbers of global LDEV correlating to local LDEV present in the current module 111 (to be referred to as "list A" in the explanation of FIG. 21). The other type is a list of numbers of global LDEV correlating to local LDEV present in another module 111 (another module 111 leading to the recovered transfer path) (to be referred to as "list B" in the explanation of FIG. 21).

In S199, the failure recovery program 154 judges whether or not a global LDEV number is present in the created list A. If a global LDEV number is present in the created list A, the result of the judgment of S199 is affirmative (Y in S199), while if it is not present, a negative judgment results (N in S199). In the case of Y in S199, the failure recovery program 154 notifies the other module 111 leading to the recovered transfer path of the global LDEV number recorded in the created list A along with recovery of the global LDEV corresponding to that global LDEV number (S19*a*). This is because there is the possibility of a path definition and the like of the global LDEV corresponding to the number recorded in the created list A being present in the other module 111 leading to the recovered transfer path. The notified other module 111 accesses the notified global LDEV number, and the [status] is restored to "normal" if a path entry 2011 containing the notified global LDEV number is present in the other module 111.

In S19*b*, the failure recovery program 154 judges whether or not a global LDEV number is present in the created list B.

The result of the judgment of S19b is an affirmative result if a global LDEV number is present in the created list B (Y in S19b), while a negative judgment results if it is not present (N in S19b). In the case of Y in S19b, the failure recovery program 154 inquires of the status of the global LDEV corresponding to the global LDEV number present in the created list B to another module 111 leading to the recovered transfer path (S19c), and judges that result (S19d). If there is a global LDEV having a [status] of "normal" present among one or more global LDEV corresponding to one or more numbers recorded in the created list B to which an inquiry of status was made to the other module 111 leading to the recovered transfer path, an affirmative judgment results (Y in S19d), while there are none such global LDEV present, a negative judgment results (N in S19d). In the case of Y in S19d, the failure recovery program 154 updates the [status] of the global LDEV having a [status] of "normal" present among one or more global LDEV corresponding to one or more numbers recorded in list B to which an inquiry of status was made to the other module 111 leading to the recovered transfer path ([status] in path entry 2011 containing that global LDEV number) to "normal" (or in other words, restores that global LDEV) (S19e).

The following provides an explanation of data migration between storage system modules 111 as carried out in the present embodiment with reference to FIGS. 22 to 26. At this time, as shown in FIG. 24A, the source global LDEV is referred to as "source global LDEV #A", while the target global LDEV is referred to as "target global LDEV #B". In addition, the local LDEV correlating to the source global LDEV is referred to as the "source local LDEV #00", while the local LDEV correlating to the target global LDEV is referred to as the "target local LDEV #10". In addition, the storage system module 111 having the source local LDEV #00 is referred to as the "source module #0", while the storage system module 111 having the target local LDEV #10 is referred to as the "target module #1". In addition, although not shown in FIGS. 22 to 26, the data migration program 155 executed by processor 147 in the source module #0 is referred to as the "source data migration program #a", while the data migration program 155 executed by processor 147 in the target module #1 is referred to as the "target data migration program #b".

Figure 22:
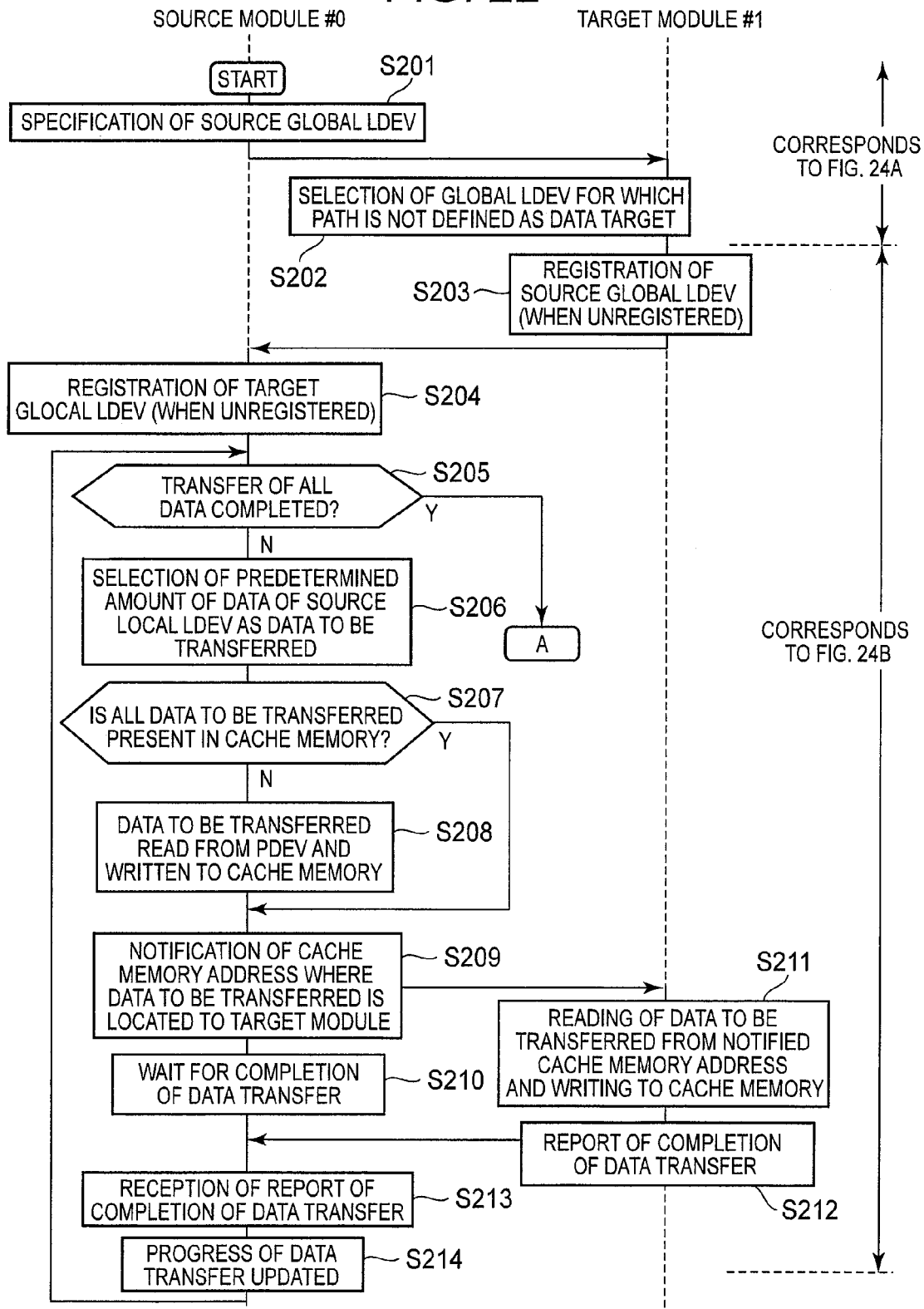
FIG. 22 shows a first portion of a flow chart of the operation of a source data migration program and a target data migration program.

FIG. 22 shows a first portion of a flow chart of the operation of the source data migration program #a and the target data migration program #b. In FIG. 22, S201 and S202 correspond to FIG. 24A, while S202 to S214 correspond to FIG. 24B.

The source data migration program #a is initiated in the case a data migration request is received from a maintenance terminal 113 or management terminal 107. A source global LDEV number (such as #A) and a target module number (such as #1), for example, are contained in the data migration request.

The source data migration program #a specifies a source global LDEV #A based on the global LDEV number in the data migration request (S201). The source data migration program #a notifies the target data migration program #b of the number of the source global LDEV and instructs selection of the target global LDEV. The target data migration program #b selects a global LDEV #B not connected to a single path for the target global LDEV (S202). If the global LDEV entry 2053 containing the number of the source global LDEV is not connected to a global LDEV directory 2052 in the target module #1, the target data migration program #b connects that entry 2053 to that directory 2052 (S203). The target data migration program #b notifies the source data migration program #a of the number of the target global LDEV. If the global LDEV entry 2053 containing the number of the target global LDEV (#B) is not connected to a global LDEV directory 2052 in the source module #0, the source data migration program #a connects that entry 2053 to that directory 2052 (S204).

The source data migration program #a executes the following S206 to S210, S213 and S214 until all data in the source local LDEV #00 is finishing being transferred to the target module #1 (or in other words, until Y in S205).

The source data migration program #a selects a predetermined amount of data in the source local LDEV #00 as data to be transferred (S206). If the data to be transferred is not present in cache memory 165 of the source module #0 (N in S207), the source data migration program #a reads the data to be transferred from PDEV 122 serving as the basis of the source local LDEV #00, and writes the read data to be transferred to cache memory 165 (S208). The source data migration program #a notifies the target module #1 of the cache address indicating the location of the data to be transferred (S209) followed by awaiting data transfer (S210).

The target data migration program #b reads the data to be transferred from the notified cache address (location in cache memory 165 of the source module #0), and writes that data to be transferred to cache memory 165 of the target module #1 (S211). Subsequently, the target data migration program #b reports completion of data transfer to the source data migration program #a (S212). The data to be transferred that has been written to cache memory 165 of the target module #1 is written to the target local LDEV #10.

The source data migration program #a receives the report of completion of data transfer (S213), and updates the progress of data transfer (S214). More specifically, the source data migration program #a updates the [migration data transfer progress pointer] in the data migration entry 2071 corresponding to data transfer in FIGS. 22 to 26.

Y results in S205 when transfer of all data in the source local LDEV #00 has finished being transferred to the target module #1.

Figure 23:
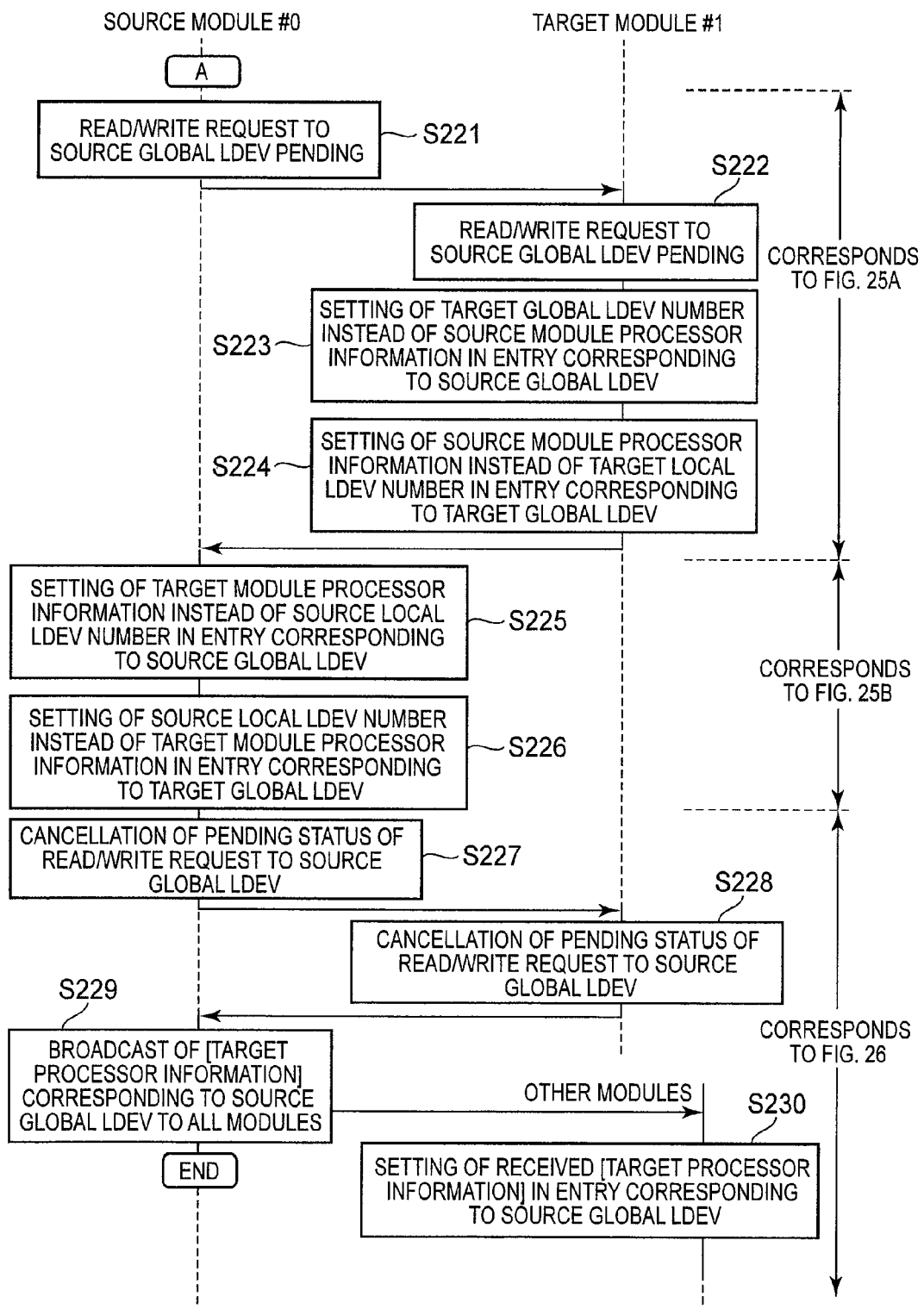
FIG. 23 shows a portion following Y in S205 of FIG. 22 (a second portion of a flow chart of the operation of a source data migration program and a target data migration program)

FIG. 23 shows the portion after Y in S205 in FIG. 22 (a second portion of a flow chart of the operation of the source data migration program and target data migration program). In FIG. 23, S221 to S224 correspond to FIG. 25A, S225 and S226 correspond to FIG. 25B, and S227 to S230 correspond to FIG. 26.

The source data migration program #a designates a read/write request to the source global LDEV #A as pending (S221). More specifically, the source global LDEV #A is not allowed to be accessed by employing a method such that even if, for example, a read/write request specified by the source global LDEV #A is received, processing is left pending with that request still left received in a storage system module 111.

The source data migration program #a instructs the target data migration program #b to hold read/write requests to the source global LDEV #A. As a result, the target data migration program #b holds read/write requests to the source global LDEV #A (S222). Furthermore, the source data migration program #a is able to instruct the not only the target module #1, but all modules 111 other than the source module #0 to hold read/write requests to the source global LDEV #A.

Figure 24A:
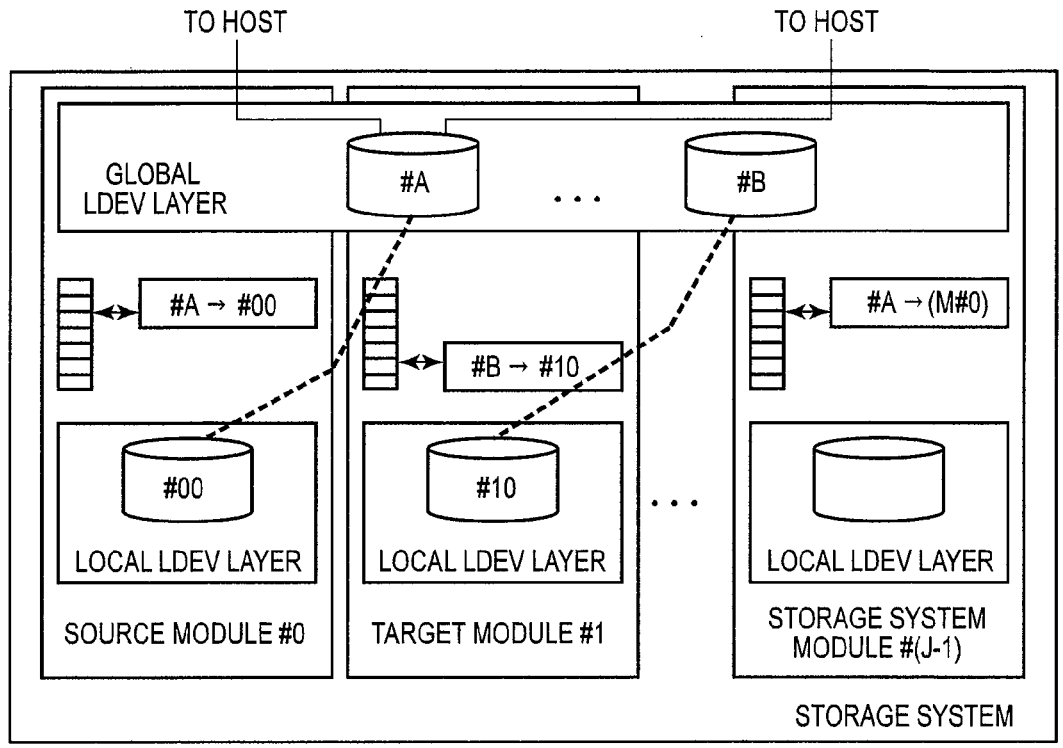
FIG. 24A is an explanatory drawing of S201 and S202 of FIG. 22.
Figure 24B:
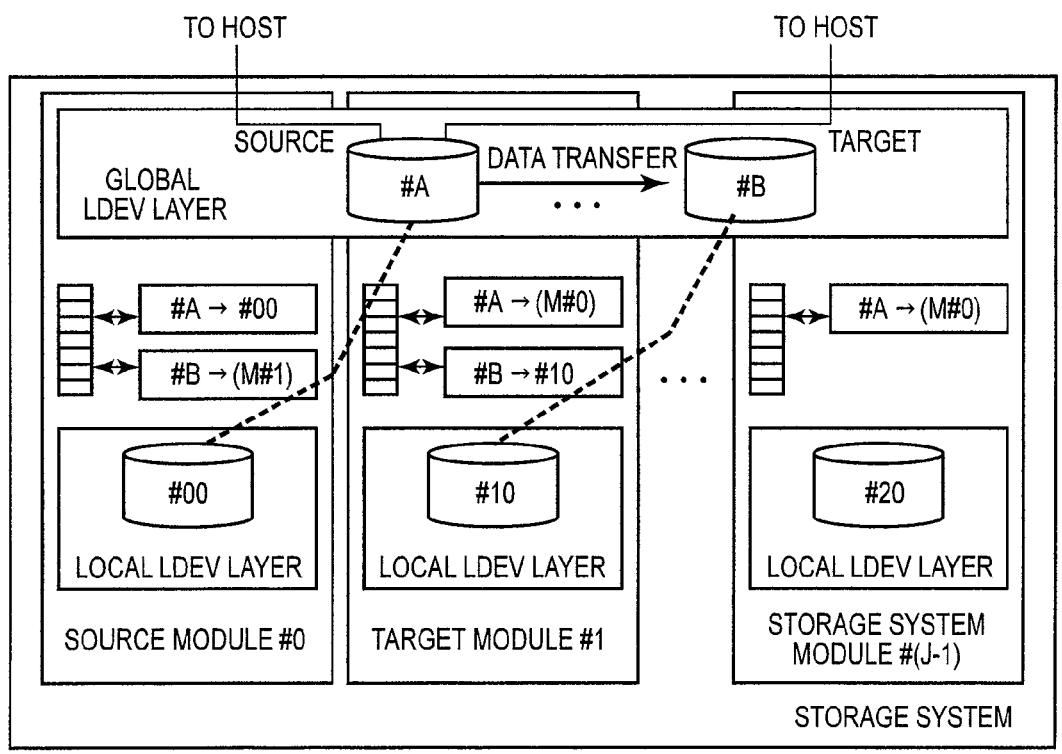
FIG. 24B is an explanatory drawing of S202 to S214 of FIG. 22.
Figure 25A:
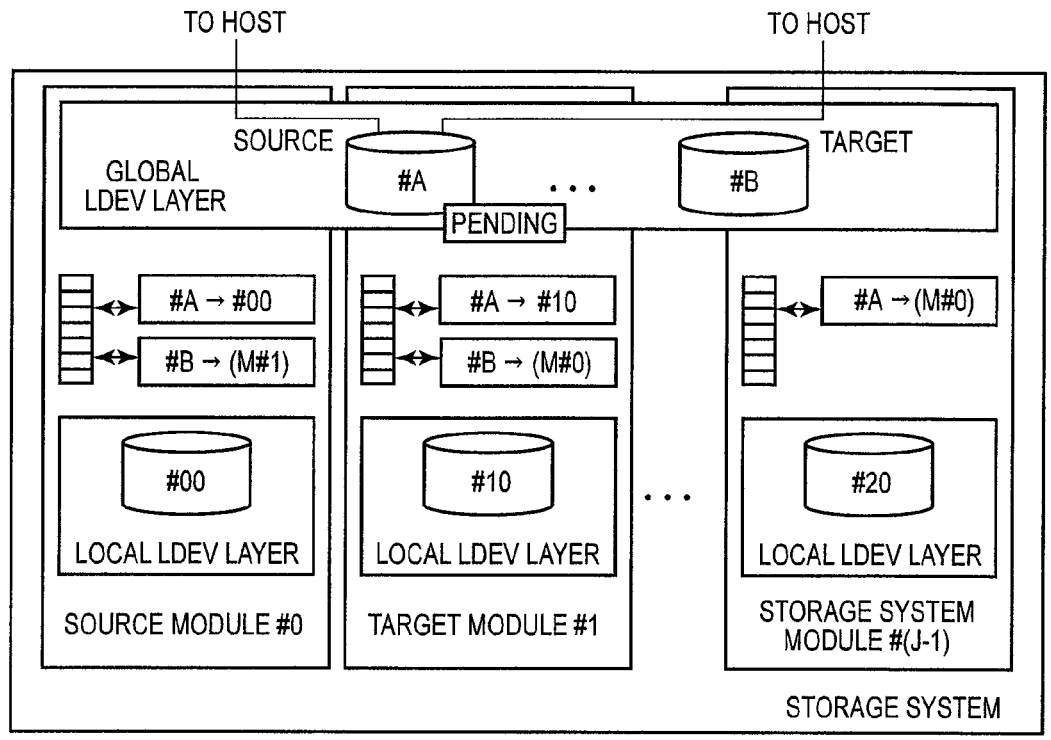
FIG. 25A is an explanatory drawing of S221 to S224 of FIG. 23.

As can be understood from a comparison of FIGS. 24B and 25A and with reference to FIG. 23, the target data migration program #b sets a [local LDEV number] representing the number "#10" of the target local LDEV, instead of [target processor information] ("M#0" shown in FIG. 24B) representing a processor in the source module #0, in the global LDEV entry corresponding to the target global LDEV #A in the target module #1 (S223). In addition, the target data migration program #b sets [target processor information]

("M#0" shown in FIG. 25A) representing a processor in the source module #0, instead of a [local LDEV number] representing the number "#10" of the target local LDEV, in the global LDEV entry corresponding to the target global LDEV #B in the target module #1 (S224). The target data migration program #b then notifies the source data migration program #a of completion.

Figure 25B:
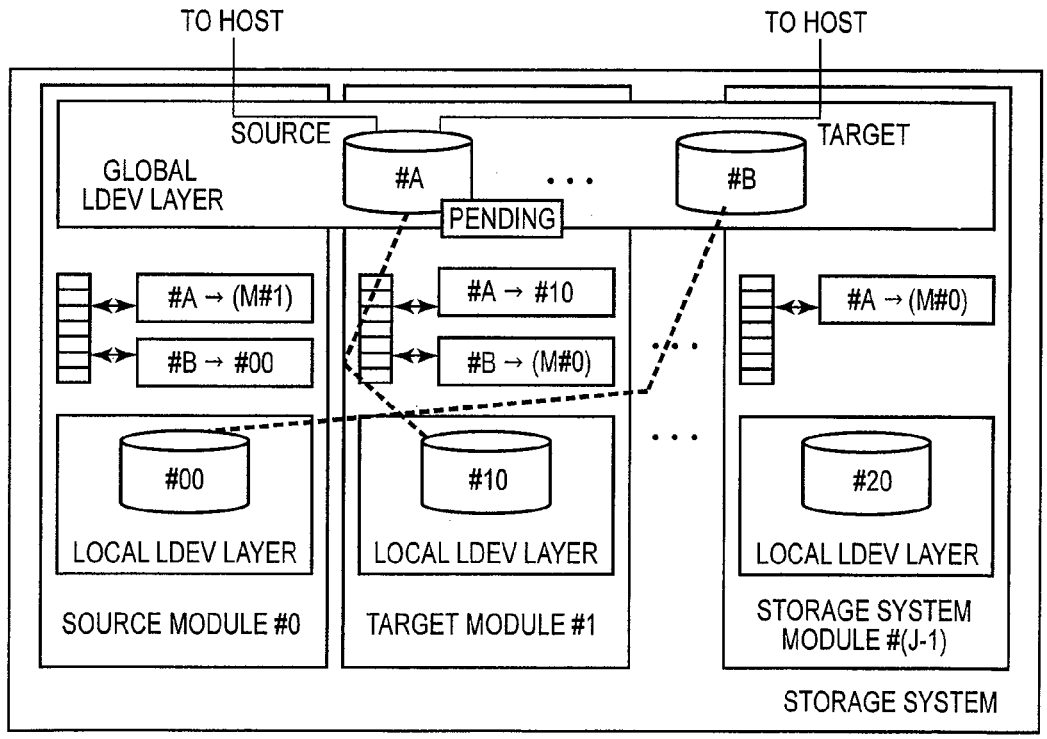
FIG. 25B is an explanatory drawing of S225 and S226 of FIG. 23.
Figure 26:
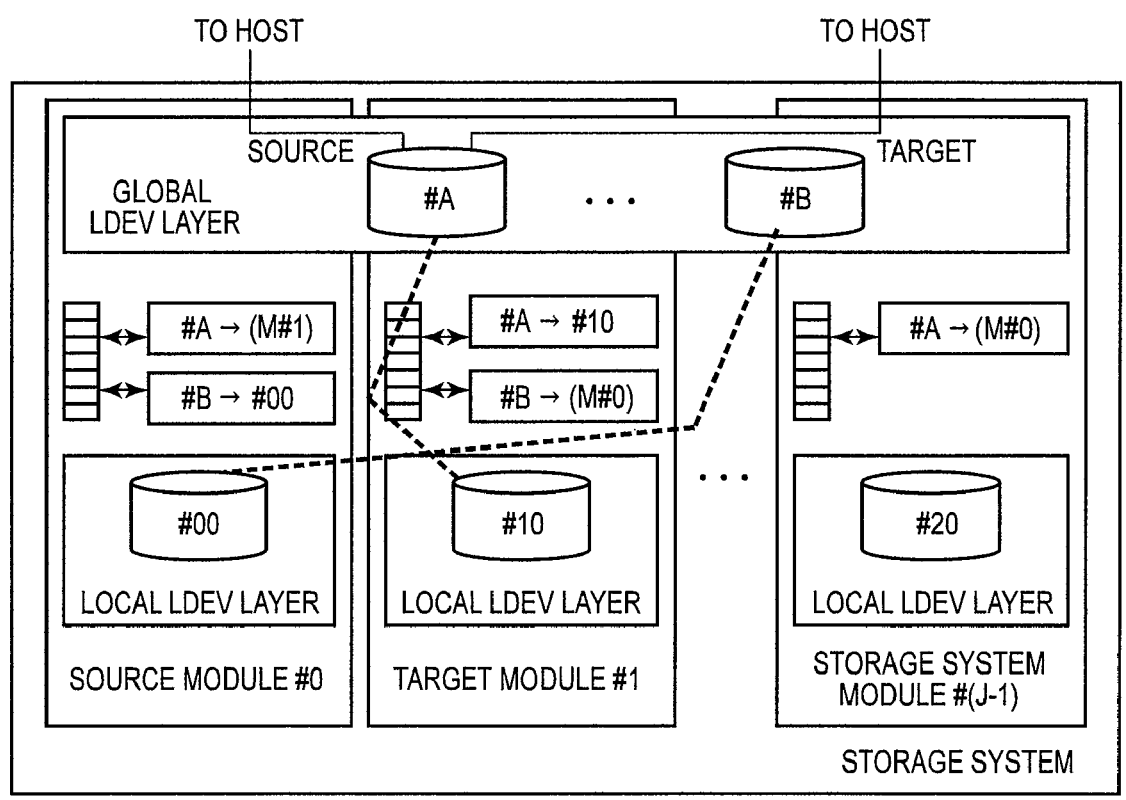
FIG. 26 is an explanatory drawing of S227 to S230 of FIG. 23.

As can be understood from a comparison of FIGS. 25A and 25B and with reference to FIG. 23, the source data migration program #a sets [target processor information] ("M#1" shown in FIG. 25B) representing a processor in the target module #1, instead of a [local LDEV number] representing the number "#" of the source local LDEV, in the global LDEV entry corresponding to the source global LDEV #A in the source module #0 (S225). In addition, the source data migration program #a sets a [local LDEV number] representing the number "#00" of the source local LDEV, instead of [target processor information] ("M#1" shown in FIG. 25A) representing a processor in the target module #1, in the global LDEV entry corresponding to the target global LDEV #B in the source module #0 (S226).

In other words, the target local LDEV #10 is correlated to the source global LDEV #A, and the source local LDEV #00 is correlated to the target global LDEV #B by S223 to S226. In other words, local LDEV correlating to the source global LDEV #A and the target global LDEV #B, respectively, are swapped.

Following S226, the source data migration program #a and the target data migration program #b cancel the pending status of read/write requests to the source global LDEV #A (S227 and S228).

The source data migration program #a broadcasts the [target processor information] corresponding to the source global LDEV #A to all storage system modules 111 (S229). As a result, as can be understood from a comparison of FIGS. 25B and 26 and with reference to FIG. 23, information representing the [target processor information] corresponding to the source global LDEV #A is updated from information "M#0" representing a processor in the source module #0 to information "M#1" representing a processor in the target module #1 in another storage system module (such as # (J-1)) (S230).

According to the example shown in FIGS. 24A to 26, two paths are connected to the source global LDEV #A. Even if an inquiry command is received from the host 101 via either of the two paths regardless of whether before data migration or after data migration, the global LDEV number of the source global LDEV #A is transmitted to the host 101 that is the transmission source of the inquiry command.

While preferred embodiments of the present invention have been described and illustrated above, it should be understood that these are exemplary of the present invention and are not to be considered as limiting. Accordingly, the present invention can also be carried out in various other forms.

What is claimed is:

1. A storage system for receiving and processing I/O requests from a host device, comprising:
a plurality of controller modules for receiving I/O requests;
a plurality of physical storage devices for storing data in accordance with I/O requests;
a plurality of global logical storage devices; and
a plurality of local logical storage devices based on the plurality of physical storage devices,
wherein each global logical storage device is a logical storage device managed by the plurality of controller modules, and correlated to any of the plurality of local logical storage devices,
wherein each local logical storage device is a logical storage device managed by one of the plurality of controller modules, and
wherein each controller module comprises:
an inter-module connection unit connectable to one or more other controller modules among the plurality of controller modules;
a storage resource that stores global device management information containing information representing whether or not a local logical storage device correlated to each global logical storage device is managed by the controller modules, and local device management information that is information relating to a local logical storage device to be managed by the controller modules among the plurality of local logical storage devices; and
an access control unit that judges whether or not the local logical storage device correlated to the global logical storage device specified by an I/O request received from the host device or a first other controller module among one or more controller modules is managed by one of the controller modules based on the global device management information, accesses the local logical storage device correlated to the global logical storage device based on the local device management information when a result of the judgment is affirmative, or transfers the received I/O request to a second other controller module among the one or more other controller modules if the result of the judgment is negative,
wherein each of the controller modules further comprises:
a data migration control unit that controls migration of data from a first local logical storage device among the plurality of local logical storage devices correlated to a first global logical storage device among the plurality of global logical storage devices, to a second local logical storage device among the plurality of local logical storage devices correlated to a second global logical storage device among the plurality of global logical storage devices;
a first data migration control unit possessed by a first controller module managing the first local logical storage device updates information relating to the first global logical storage device in the global device management information stored by the storage resource possessed by the first controller module to information representing that a local logical storage device correlated to the first global logical storage device is not managed by the first controller module; and
a second data migration control unit possessed by a second controller module managing the second local logical storage device updates information relating to the first global logical storage device in the global device management information stored by the storage resource possessed by the second controller module to information representing that the first global logical storage device is correlated to the second local logical storage device managed by the second controller module,
wherein cache memory that temporarily stores data to be written to the local logical storage devices or data read from the local logical storage devices is contained in the storage resource of each the storage modules,
wherein the first data transfer control unit, during the data migration, reads data from the first local logical storage device, writes the read data to a first cache memory in the storage resource possessed by the first controller module, and notifies the second data transfer control unit of data location information representing the location of the written data, and wherein the second data transfer control unit, during the data migration, reads data from the location of data specified by data position information received from the first data transfer control unit, and writes the read data to the second local logical storage device.

2. The storage system according to claim 1, wherein cache memory that temporarily stores data to be written to the local logical storage devices or data read from the local logical storage devices is contained in the storage resource of each of the storage modules, wherein the received I/O request is a read request, wherein the access control unit possessed by the other controller module reads data from the local logical storage device correlated to the global logical storage device specified by a read request received from the controller module, writes the read data to the cache memory possessed by the other controller module, and notifies the access control unit possessed by the controller module of data location information representing the location of the written data, and wherein the access control unit possessed by the controller module reads data from the location of data specified by the data position information received from the access control unit possessed by the other controller module, and transmits the read data to a transmission source of the read request.

3. The storage system according to claim 1, wherein cache memory that temporarily stores data to be written to the local logical storage devices or data read from the local logical storage devices is contained in the storage resource of each of the storage modules, wherein the received I/O request is a write request, wherein the access control unit possessed by the controller module writes data in accordance with the received write request to the cache memory possessed by the controller module, and notifies the access control unit possessed by another controller module, which is a target of the write request, of data location information representing the location of the written data, and wherein the access control unit possessed by the other controller module reads data from the location of data specified by the data position information received from the access control unit possessed by the controller module, and writes the read data to the local logical storage device correlated to the global logical storage device specified by the received write request.

4. The storage system according to claim 1, wherein a plurality of a first type of global device management information elements corresponding to the plurality of global logical storage devices, and two or more second type of global device management information elements are contained in the global device management information, wherein information relating to a corresponding global logical storage device is registered in each of the first type of global device management information elements, wherein the number of the two or more second type of global device management information elements is less than the number of the first type of global device management information elements, wherein one or more first type of global device management information elements among the plurality of first type of global device management information elements is correlated to each of the two or more second type of global device management information elements, and wherein each of the two or more second type of global device management information elements is specified by a hash value of an identifier of the global logical storage device.

5. The storage system according to claim 1, wherein in a case where the same global logical storage device is correlated to a plurality of paths that are able to be specified by the host device, the access control unit of each of the controller modules provides the host device with an identifier of the same global logical storage device no matter which of the plurality of paths is used to receive an inquiry command.

6. The storage system according to claim 1, wherein an identifier of each of the global logical storage devices contains an identifier of a controller module that has generated the global logical storage device, an identifier of a local logical storage device correlated to the global logical storage device, and a non-duplicated code serving as a different code even if a global logical storage device, to which the same local logical storage device is correlated, is generated by the same controller module.

7. The storage system according to claim 1, wherein one or more transfer paths are present between the controller modules and the other controller modules, wherein each of the controller modules further comprises a global device blocking unit, and wherein the global device blocking unit blocks the global logical storage device correlated to the local logical storage device possessed by the other controller modules when none of the one or more transfer paths is able to allow the received I/O request to pass therethrough.

8. The storage system according to claim 7, wherein each of the controller modules further comprises:

a global device recovery unit, in a case where recovery of any of the one or more transfer paths has been detected, the global device recovery unit notifies the other controllers of an identifier of the global logical storage device correlated to the local logical storage device that is a management target of the controller modules, and inquires of the status of a blocked global logical storage device correlated to the local logical storage device possessed by the other controller modules to the other controller modules, and in a case where a result of then inquiry is normal, the blocked global logical storage device correlated to the local logical storage device possessed by the other controller modules is recovered.

* * * * *